(12) United States Patent
Jun et al.

(10) Patent No.: US 6,700,648 B2
(45) Date of Patent: Mar. 2, 2004

(54) METHOD FOR CONTROLLING A PROCESSING APPARATUS

(75) Inventors: Kyoung Shik Jun, Gyeonggi-do (KR); Chan Hoon Park, Seoul (KR); Yil Seug Park, Gyeonggi-do (KR); Bong Su Cho, Gyeonggi-do (KR); Hyun Tai Kang, Gyeonngi-do (KR); Jae Won Hwang, Seoul (KR); Young Ho Jei, Pusan (KR)

(73) Assignee: Samsung Electronics, Co., Ltd., Suwon (KR)

( * ) Notice: Subject to any disclaimer, the term of this patent is extended or adjusted under 35 U.S.C. 154(b) by 117 days.

(21) Appl. No.: 10/072,901

(22) Filed: Feb. 12, 2002

(65) Prior Publication Data
US 2003/0058428 A1 Mar. 27, 2003

(30) Foreign Application Priority Data
Jul. 3, 2001 (KR) .................................... 2001-39371

(51) Int. Cl.[7] ................. G03B 27/32; G03B 27/42; G06F 19/00; G05B 13/02; G06K 9/62
(52) U.S. Cl. ................. 355/77; 355/53; 700/121; 706/23; 382/156; 356/400
(58) Field of Search ............ 355/53, 77; 700/104, 700/121; 702/85; 706/21, 23, 903; 382/156; 356/399, 400, 401

(56) References Cited

U.S. PATENT DOCUMENTS

| | | | | |
|---|---|---|---|---|
| 5,283,746 A | * | 2/1994 | Cummings et al. | 700/104 |
| 5,467,883 A | * | 11/1995 | Frye et al. | 216/60 |
| 5,497,331 A | * | 3/1996 | Iriki et al. | 700/121 |
| 5,864,773 A | * | 1/1999 | Barna et al. | 702/85 |
| 6,556,876 B1 | * | 4/2003 | Prosack et al. | 700/50 |

FOREIGN PATENT DOCUMENTS

| | | |
|---|---|---|
| EP | 0 443 249 A2 | 12/1990 |
| EP | 0 443 249 A3 | 12/1990 |
| EP | 0 602 855 A1 | 12/1993 |

\* cited by examiner

*Primary Examiner*—Alan A. Mathews

(57) ABSTRACT

In a method for controlling a processing apparatus, an error value between an input value of the processing apparatus for processing a subject to be processed, and a measurement value obtained by measuring the subject being processed is obtained. A correction value is computed for correcting the input value of the processing apparatus in the direction of decreasing the error value, and the values are managed as processing data to be utilized in computing a next correction value. Previous processing data having a history identical to that of the subject loaded to the processing apparatus is searched, and a current bias correction value is predicted from a plurality of most recent correction values having the identical history. Also, a current random correction value is predicted by means of a neural network on the basis of a plurality of most recent random correction values. The predicted bias correction value is summed with the random correction value as a current correction value of the processing apparatus.

18 Claims, 37 Drawing Sheets

FIG. 3
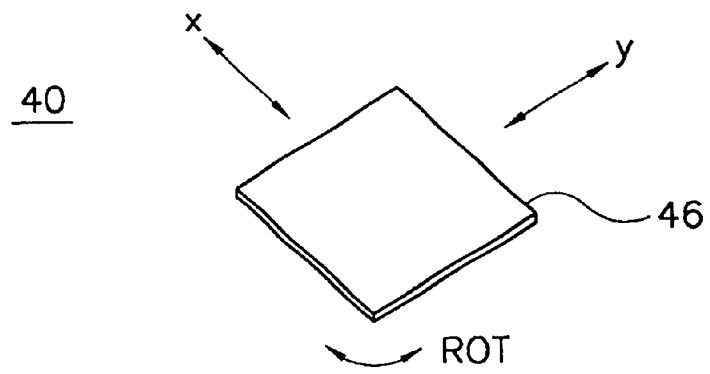
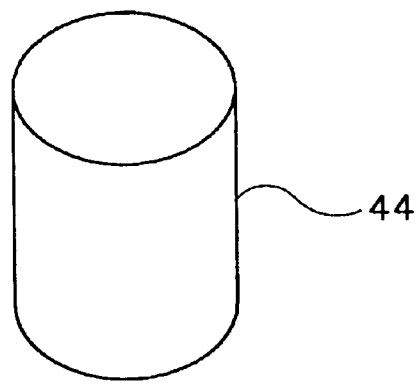
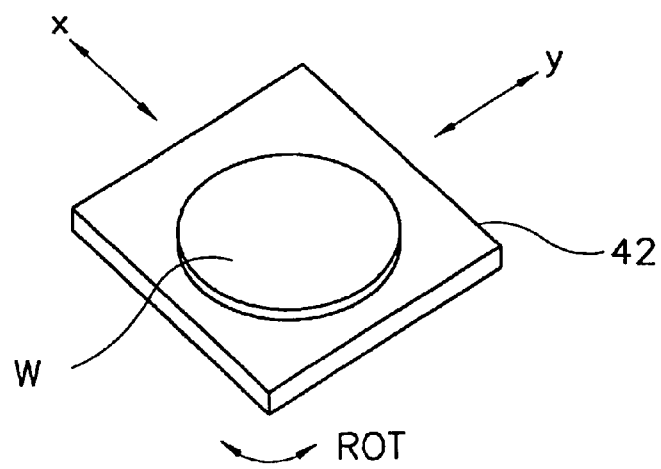

FIG. 4

| MEASURING TIME |
| --- |
| LOT ID |
| OF-X |
| OF-Y |
| SC-X |
| SC-Y |
| ORT |
| W-ROT |
| RED-X |
| RED-Y |
| ROT-X |
| ROT-Y |

FIG. 5

| GENERATING TIME | | | |
|---|---|---|---|
| LOT ID | | | |
| FWD OF-X | RET OF-X | NN OF-X | IN OF-X |
| OF-Y | OF-Y | OF-Y | OF-Y |
| SC-X | SC-X | SC-X | SC-X |
| SC-Y | SC-Y | SC-Y | SC-Y |
| ORT | ORT | ORT | ORT |
| W-ROT | W-ROT | W-ROT | W-ROT |
| RED-X | RED | RED | RED |
| RED-Y | | | |
| ROT-X | ROT | ROT | ROT |
| ROT-Y | | | |

FIG. 8 CORRECTION APPARATUS INPUT AFTER SUBTRACTING MEAN VALUE PER IDENTICAL HISTORY

FIG. 21
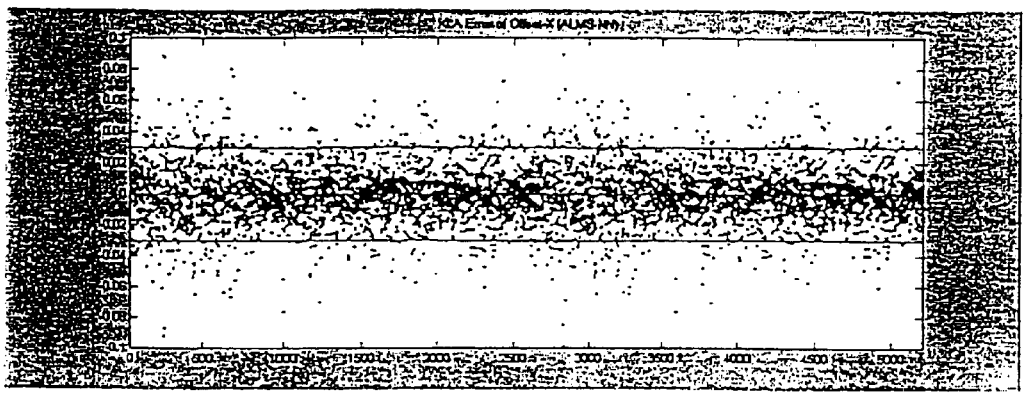
MEASUREMENT ERROR DISTRIBUTION OF MEASURER
INSTRUMENT OF OFFSET-X (ALMS-NN)
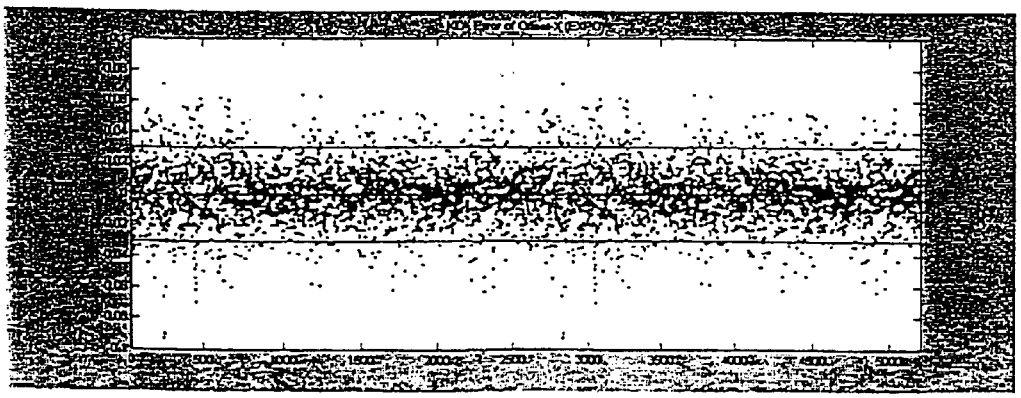
MEASUREMENT ERROR DISTRIBUTION OF MEASURER
INSTRUMENT OF OFFSET-X (TRADITIONAL SYSTEM)

FIG. 22
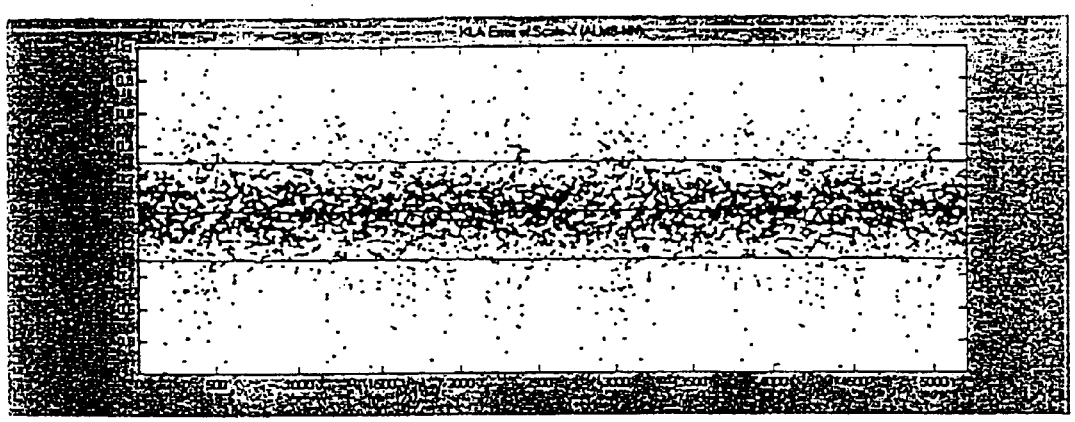
MEASUREMENT ERROR DISTRIBUTION OF MEASURER
INSTRUMENT OF SCALE-X (ALMS-NN)
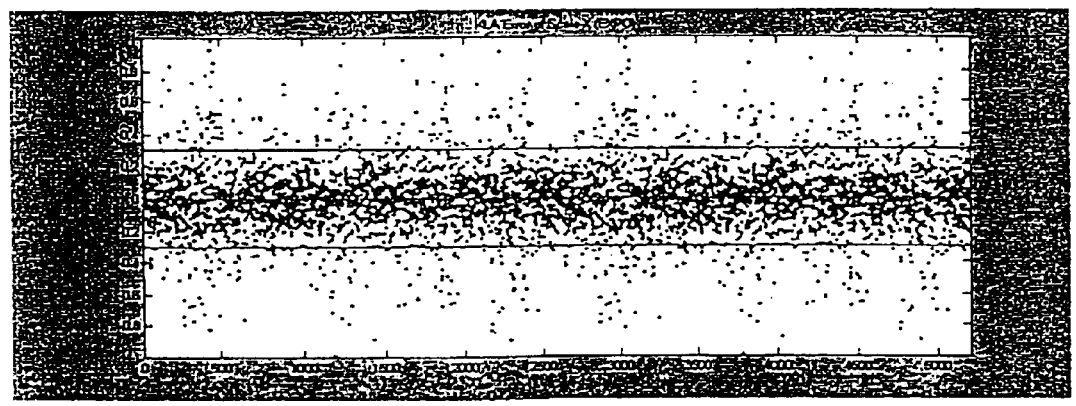
MEASUREMENT ERROR DISTRIBUTION OF MEASURER
INSTRUMENT OF SCALE-X (TRADITIONAL SYSTEM)

FIG. 23
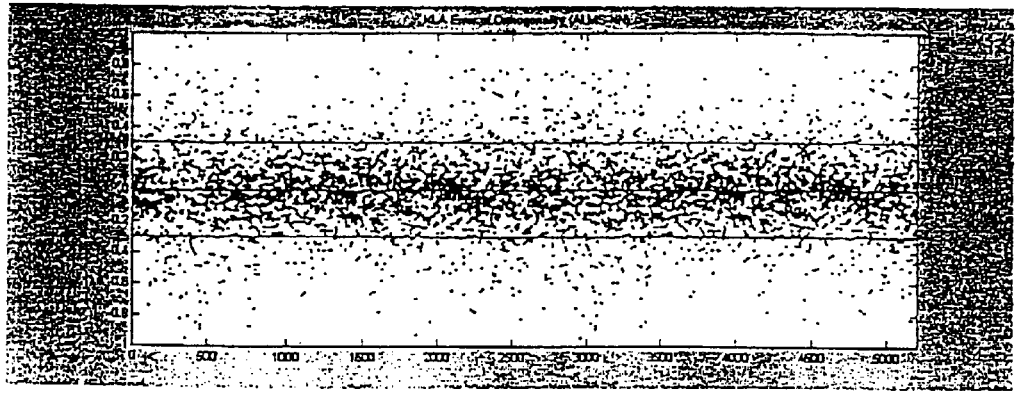
MEASUREMENT ERROR DISTRIBUTION OF MEASURER
INSTRUMENT OF ORTHOGONALITY (ALMS-NN)
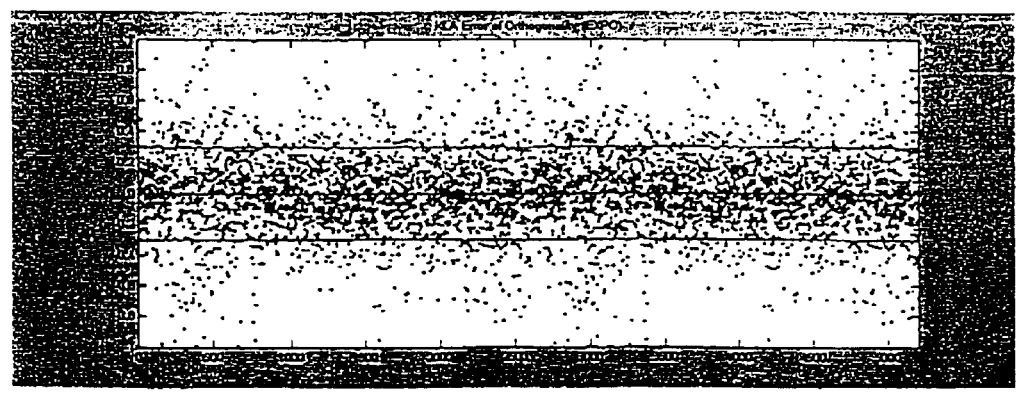
MEASUREMENT ERROR DISTRIBUTION OF MEASURER
INSTRUMENT OF ORTHOGONALITY (TRADITIONAL SYSTEM)

FIG. 24
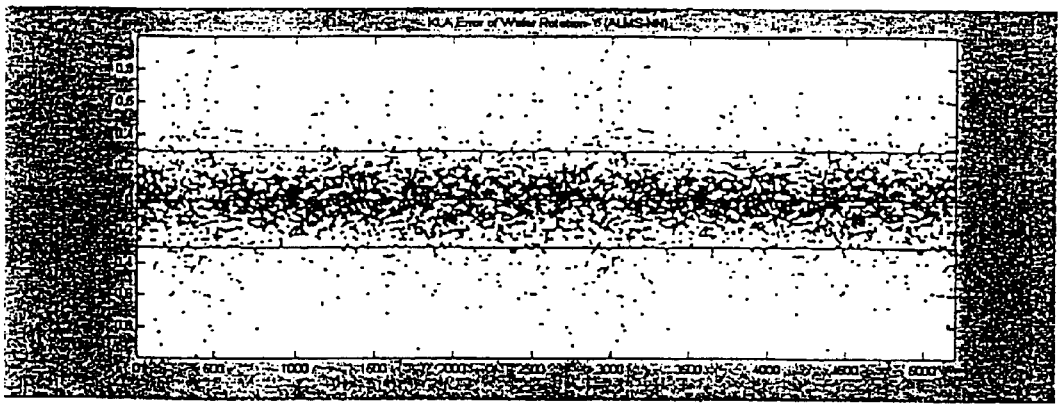
MEASUREMENT ERROR DISTRIBUTION OF MEASURER
INSTRUMENT OF WAFER ROTATION-Y (ALMS-NN)
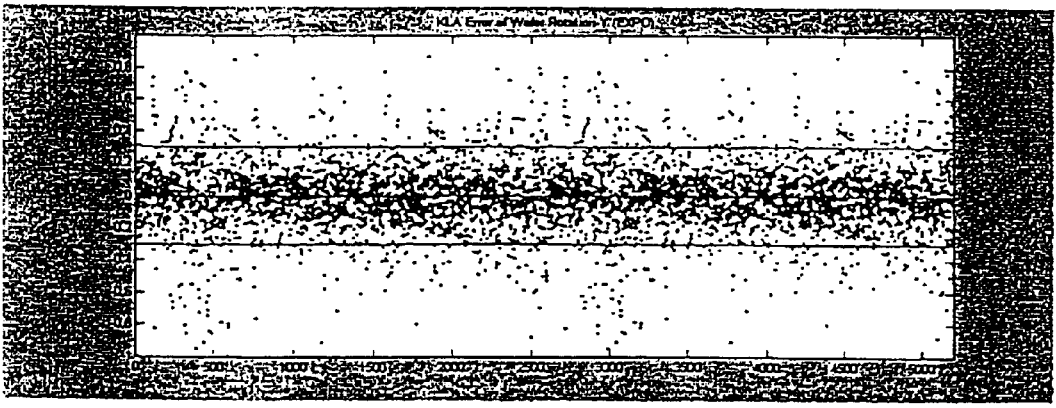
MEASUREMENT ERROR DISTRIBUTION OF MEASURER
INSTRUMENT OF WAFER ROTATION-Y (TRADITIONAL SYSTEM)

FIG. 25
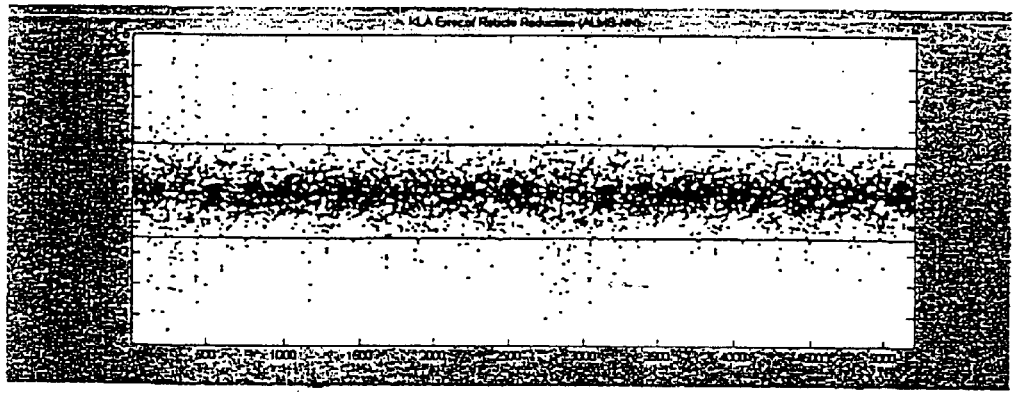
MEASUREMENT ERROR DISTRIBUTION OF MEASURER
INSTRUMENT OF RETICLE REDUCTION (ALMS-NN)
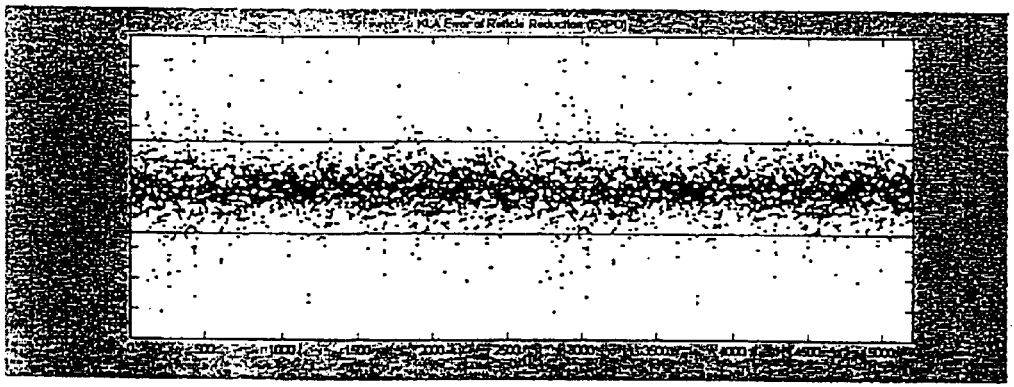
MEASUREMENT ERROR DISTRIBUTION OF MEASURER
INSTRUMENT OF RETICLE REDUCTION (TRADITIONAL SYSTEM)

MEASUREMENT ERROR COMPARISON OF MEASURER INSTRUMENT OF WAFER ROTATION-Y

MEASUREMENT ERROR COMPARISON OF MEASURER INSTRUMENT OF RETICLE REDUCTION

APPARATUS INPUT VALUE FORMAT OF ORTHOGONALITY

APPARATUS INPUT VALUE FORMAT OF WAFER ROTATION-Y

METHOD FOR CONTROLLING A PROCESSING APPARATUS

CROSS-REFERENCES TO RELATED APPLICATIONS

This application relies for priority upon Korean Patent Application No. 2001-0039371, filed on Jul. 3, 2001, the entire contents of which are hereby incorporated herein by reference for all purposes as if fully set forth herein.

BACKGROUND OF THE INVENTION

1. Field of the Invention

The present invention relates to a method for controlling a processing apparatus, and more particularly to a method for controlling a processing apparatus in conformity with a new Adaptive Least Mean Square Neural Network (ALMS-NN) algorithm for evaluating a correction value of a stepper during a photolithographic process in an overall process of manufacturing semiconductor devices.

2. Description of the Related Art

As one way for strengthening competitiveness in the semiconductor industry, a great number of studies have been made for constructing an effective manufacturing system capable of ensuring a high production yield. Especially in case of a photolithographic process, which is one of the important semiconductor manufacturing processes, as the processing conditions are frequently varied, necessitating development of a systematic production system to deal with the frequent variation, considerable efforts for establishing a system that reduces the frequency of sampling processes are being directed to enhance the production yield.

It is a misalignment problem in the processing that is to be primarily considered during the photolithographic process for establishing such a system. The problem chiefly occurs due to a difficulty in analyzing the physical and chemical characteristics of the process, noise interference during performing the process, and measurement errors after performing the process, which become reasons for increasing the frequency of the sampling that directly affects the production yield.

A Process Control System (PCS), widely developed and employed as a production system capable of ensuring a high production yield for the semiconductor manufacturing system, mostly involves no mathematical model with respect to the process steps, but controls the process in view of numerical values statistically obtained by processing data of the previously performed processing.

The scheme for reflecting the previous experience values of prior processing in a current process as a kind of 'experience inheritance,' is an algorithm that feeds back a mean of weighted values with respect to recent historical data of identical processes. However, such an algorithm is static, without considering the temporally changing characteristics of a system, having a drawback that the sampling process has to be repeatedly performed because of insufficient identical history data within a fixed period, or successive spec-out generation.

For this reason, processing controller design techniques using a neural network model have been currently suggested as a scheme for properly dealing with a process of a non-linear system without having a specific mathematical model ("Monitoring and Control of Semiconductor Manufacturing Processes," IEEE Control System, 1998 by S. Limanond, J. Si, and K. Tsakalis; and "Artificial Neural Network Model-Based Run-to-Run Process Controller," IEEE Trans. on Component, Packaging, and Manufacturing Technology-Part C, vol. 10, no. 1, January 1996 by X. A. Wang and R. L. Mahajan).

First, there has been suggested a method for allowing the neural network to learn by means of data from previously conducted processes, thereby predicting the manufacturing process via a pattern search with respect to a previous process. The basic premise of this method is in that the variation pattern of the non-linear system is not completely random. Accordingly, it is possible to predict that the past history data involving a pattern similar to the recent variation pattern may exist, unless the variation pattern of the system with respect to a certain stepper is completely random, so that the variation pattern of the past system is utilized to presume a current output value.

However, this method has disadvantages of being liable to induce a difficulty in using the data because it requires a lot of past history data to be effectively applied, and increasing the amount of computing required because of the continuously repeated pattern search and neural network learning.

Second, a widely utilized Exponential Weighted Moving Average (EWMA) system provides modeling and approximating methods of a system having a data variation capable of being described in a time series system, which are widely available in the processing control field of semiconductor manufacturing. This has been disclosed in literature such as "Run by Run Process Control: Combining SPC and Feedback Control," IEEE Trans. on Semiconductor Manufacturing, vol. 8, no. 1, February 1995 by E. Sachs, A. Hu, and A. Ingolfsson; "Adaptive Optimization of Run-to-Run Controllers: The EWMA Example," IEEE Trans. on Semiconductor Manufacturing, vol. 13, no. 1, February 2000 by N. S. Patel and S. T. Jenkins; and "A Self-Tuning EWMA Controller Utilizing Artificial Neural Network Function Approximation Techniques," IEEE Trans. on Components, Packaging, and Manufacturing Technology-Part C, vol. 20 no. 2, April, 1997 by T. H. Smith, D. S. Boning.

The EWMA system is frequently applied to the actual operation of semiconductor devices, as its model is simple and it also is possible to apply a simple recursive formula as the equation written by:

$$\overline{x(x)} = \lambda x(i-6) + (1-\lambda)\overline{x}(i-1)$$

However, if the $\lambda$ value used is small, non-negligible weight is applied upon past data when applying the EWMA system, causing a drawback of requiring a lot of past data for performing accurate estimation.

Third, the system predication technique by means of the Kalman Filtering is a classical predication technique with respect to a system of which motion characteristics are fundamentally modeled by a differential equation or difference equation in a state-space form and are interrupted by a white noise.

Based on the fact that the correction value of the system is generally changed by the noise, even though it involves no change without being interrupted by the noise, the variation characteristic of the correction value is assumed to be a linear model as follows:

$$x(k+1) = x(k) + w(k)$$

Here, a reference alphabet w(k) denotes a white noise term that becomes a cause of varying the correction value.

At this time, the performance is determined in accordance with the supposed system model how the model by reproduces the motion characteristics and noise characteristics of an original system. However, it is not easy to provide a supposed model similar to an original system in such a system that has the highly linear characteristics like the semiconductor process.

SUMMARY OF THE INVENTION

In order to solve the above-enumerated problems of the conventional technique, an object of the present invention is to provide a method for controlling a processing apparatus having a new ALMS-NN algorithm, capable of being effectively applied to a process that highly depends on a sampling due to a frequent replacement of work pieces subjected to the processing without depending on a number of past history data.

Another object of the present invention is to provide a method for controlling a photolithography apparatus having a new ALMS-NN algorithm for deciding an apparatus input value capable of effectively correcting an overlay alignment error by using a stepper apparatus during a photolithographic process as a target.

Accordingly, there is provided a method for controlling a processing apparatus, in which an error value between an input value of the processing apparatus for processing a work piece to be processed, and a measurement value obtained by measuring the work piece processed in the processing apparatus is obtained, a correction value for correcting the input value of the processing apparatus is computed in order to decrease the error value, and the values are managed as processing data to be utilized in computing a next correction value. The previous processing data having a history identical to the work piece loaded to the processing apparatus are searched, and a current bias correction value is predicted from the latest plurality of previous correction values out of the searched previous processing data having the identical history. Also, a current random correction value (RAND) is predicted by means of a neural network on the basis of the latest plurality of previous RAND correction values out of the previous processing data, and the predicted bias correction value is summed with the random correction value (RAND) as a current correction value of the processing apparatus. By using the error value, the neural network is made to learn for tracking the variation of the RAND correction value.

In more detail, for effectively predicting the correction value x(n) in the present invention, the correction value x(n) is divided into a bias component $x_{bias}(n)$ correlated with the history and a random component $x_{rand}(n)$ with the random property of which the reason of variation cannot be definitely perceived. Here, $x_{bias}(n)$ is predicted on the basis of the history of the corresponding lot. In connection with the $x_{rand}(n)$ component which impedes a definite prediction of x(n), because it is nearly impossible to accurately predict the RAND component due to its random property, its variation is tracked by using a feedback propagation learning of the neural network to minimize the prediction error of x(n).

At this time, as the $x_{rand}(n)$ component has a property of eliminating the correlation with the history of the corresponding lot, all data can be utilized regardless of the history of the corresponding lot.

Therefore, in view of x(n) computed by the algorithm suggested in the present invention, if the temporal variation of $x_{bias}(n)$ is not so large, the restriction of data expiration having been a problem in the traditional correcting system can be solved. Also, even when the external factor affecting x(n) in addition to the history of the corresponding lot is varied, it can be effectively managed by using the learning capability inherent to the neural network.

Accordingly, the dependence upon the previous history data is decreased even in a manufacturing line involving a number of device changes, with the consequence of remarkably reducing the number of sampling process.

The step of predicting the current bias correction value is performed by a section linear weighted mean algorithm defined by the equation as follows:

$$x_{bias} = \frac{1}{W} \sum_{i=n-W+1}^{n} \left[ \frac{W+n-1}{\sum_{j=1}^{W} i} x^{sh}(i) \right]$$

where a reference alphabet $x_{bias}$ denotes the bias correction value, W denotes a section and, $x^{sh}$ denotes the previous bias correction value having the identical history.

The current RAND correction value is obtained by tracking in the direction of decreasing the error of the RAND correction value by means of an error feedback propagation learning method via a multilayer perceptron.

To achieve another object of the present invention, there is provided an apparatus for controlling a photolithography apparatus wherein an error value between an input value of the photolithography apparatus for processing a photoresist over a wafer, and a measurement value obtained by measuring a photoresist pattern subjected to an exposure and a development in the processing apparatus by means of an overlay measurer instrument is obtained, a correction value for correcting the input value in the direction of decreasing the error value is computed, and then photolithographic processing data in the production time unit are managed for utilizing the values in computing a next correction value. The previous processing data having a history identical to that of a new lot loaded to the photolithography apparatus are searched, and a bias component of a current correction value is predicted from the latest plurality of previous correction values out of the searched previous processing data having the searched identical history. A RAND component of the current RAND correction value is predicted by means of a neural network on the basis of the latest plurality of previous RAND correction values out of the previous processing data, and the predicted bias component is summed with the RAND component as a current correction value of the photolithography apparatus. The error value is used for making the neural network learn to track the variation of the RAND component.

Here, in the searching step, data having the identical reticle, PPID, base I and base II that are the history constituting elements is detected as identical history processing data.

In addition, if no processing data of identical history exists in the searching step, the bias portion of the correction value is guessed in accordance with the priority of remaining elements among processing data having the identical reticle element.

In association with the guessing method, the processing data having any one element different among history constituting elements are extracted, the bias component of the correction value is guessed by using a relative value of any one constituting elements among the extracted processing data with the single different constituting element, and the bias component of the correction value is guessed by obtaining a mean value of the extracted processing data with the single different constituting element if the bias component cannot be computed by means of the relative value.

BRIEF DESCRIPTION OF THE DRAWINGS

The above objects and other advantages of the present invention will become more apparent by describing in detail preferred embodiments thereof with reference to the attached drawings, in which:

FIG. 3 is a view showing a diagrammatic construction of the photolithography apparatus;

FIG. 4 is a view showing measurement data format down from the overlay measurer instrument to an overlay correction controller;

FIG. 5 is a view showing a correction data format received from the overlay correction controller to a stepper;

FIGS. 21 to 25 are graphs obtained by comparing the measurement error distribution of the overlay correction controller according to the present invention with that of the conventional controller.

DESCRIPTION OF THE PREFERRED EMBODIMENT

Now, the present invention will be described in more detail with reference to accompanying drawings.

Figure 1:
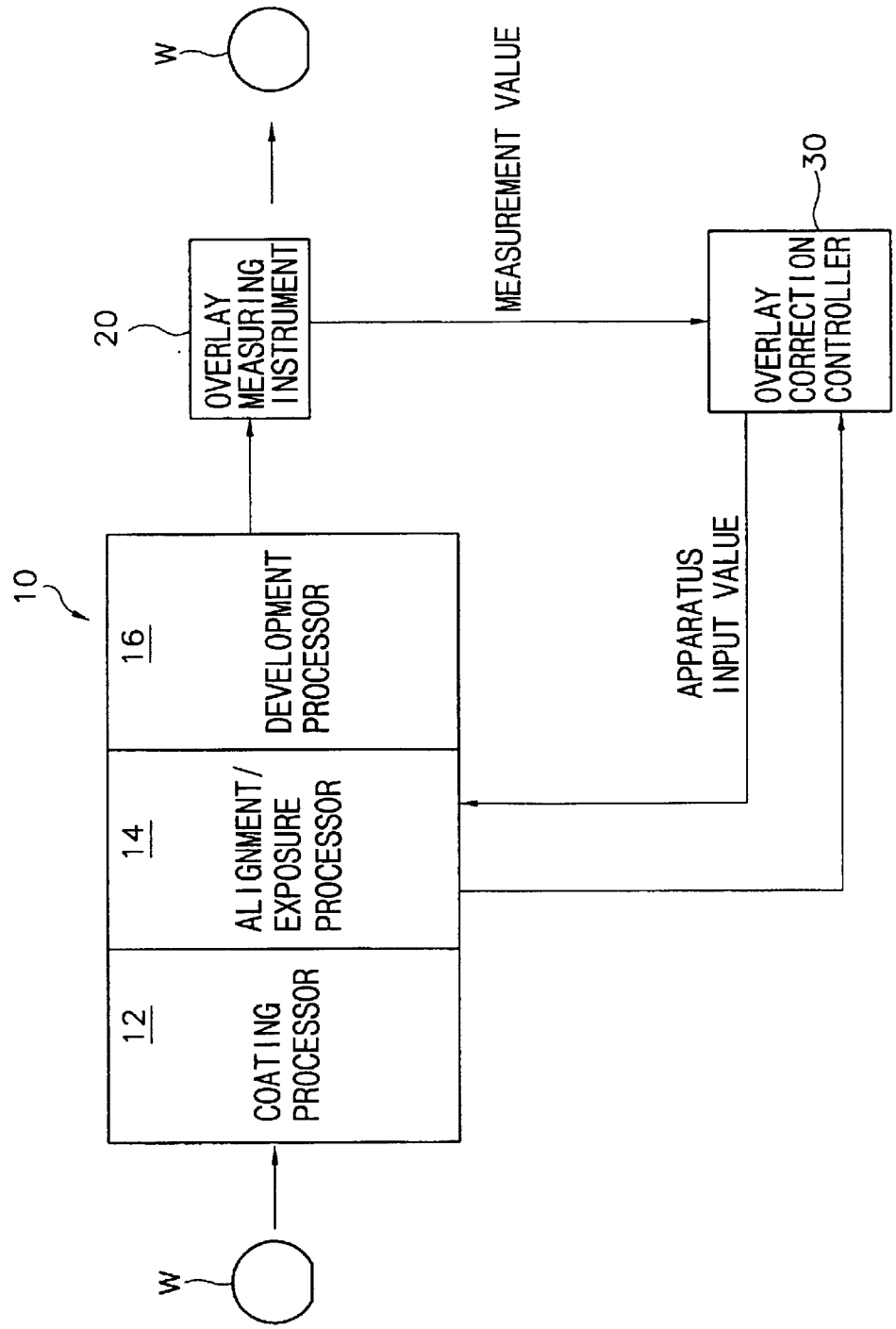
FIG. 1 is a block diagram showing a system for controlling a photolithography apparatus according to one embodiment of the present invention.

FIG. 1 is a block diagram showing a controlling system of a photolithography apparatus according to the present invention.

A photolithography apparatus 10 includes a coating processor 12, an alignment/exposure processor 14 and a development processor 16.

The photolithography apparatus 10 forms a single pattern layer over a wafer W by performing a photolithographic process in which an etched layer is deposited on a wafer W, a photoresist pattern is formed over the etched layer and the etched layer is etched by using the photoresist pattern as an etch mask. The foregoing process is repeated upon each layer to overlap a multi-layered pattern's layers and a desired circuit pattern is formed on the wafer, so that a plurality of integrated circuit chips are formed on the single wafer.

Therefore, the photolithographic process can be a highly important key process significantly affecting a production yield in a manufacturing process of a semiconductor device.

The photolithographic process may be largely classified into a coating process, alignment and exposure process, and a development process.

The coating processor 12 performs a pre-bake process that eliminates the moisture over the surface of the wafer for enhancing an adherence property of the wafer and a photoresist to be applied, a scrubbing process that eliminates impurities over the surface of the wafer by using high-pressure pure water and a brush, a spin process that performs a consistent coating, and a soft bake process that evaporates a solvent and hardens the photoresist.

The alignment and exposure processor 14 performs a pre-alignment process that aligns a reticle in accordance with a reference mark of a stepper and aligns the wafer and reticle, an alignment process that fixes a flat zone of the wafer, and an exposure process that determines an amount to expose the photoresist.

The development processor 16 performs a post exposure process for removing a standing-wave effect, a development process for selectively eliminating a portion reacting with ultraviolet rays, and a hard bake process for hardening the photoresist pattern remaining on the wafer enough to endure a thermal environment.

After forming the photoresist pattern over wafer W by means of the photolithography apparatus 10 as described above, a misalignment at a point of overlaying with an underlying pattern layer should be measured by means of an overlay measurement instrument 20 to confirm whether it has a value within an error tolerance limit.

In the overlay measurement instrument 20, all patterns of the overlapping pattern layers cannot be compared to measure the misalignment. Accordingly, the misalignment is measured by means of a misalignment-measuring site added onto wafer W.

Figure 2:
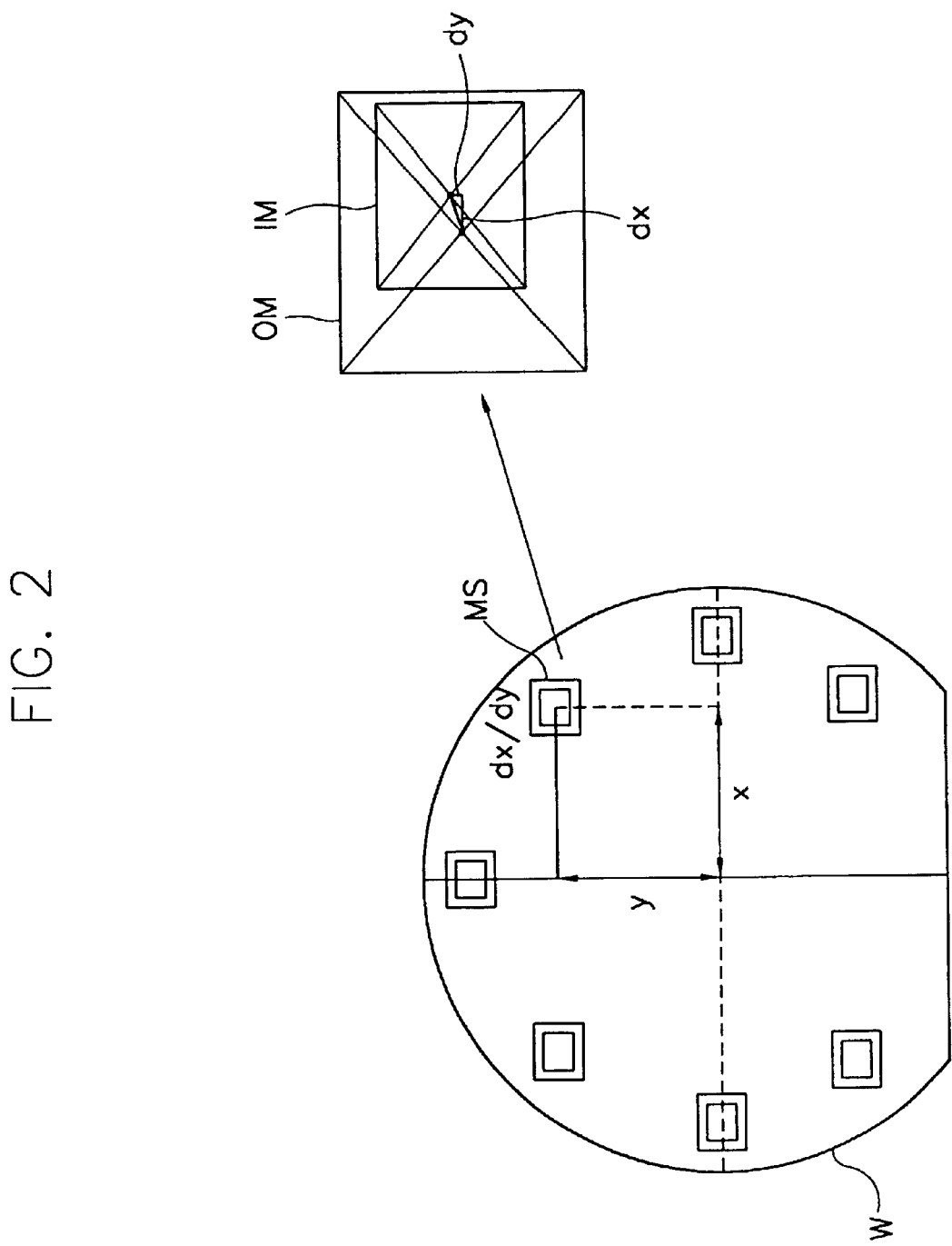
FIG. 2 is a view for describing measuring parameters of an overlay measurer instrument.

Referring to FIG. 2, after designating a measuring site out of misalignment sites MS formed over wafer W, coordinates dx/dy between an outer alignment mark OM formed to a lower pattern layer of the designated site and inner alignment mark IM formed to an upper pattern layer are measured. Then, misalignment parameters as described below are extracted via recursive analysis with respect to the obtained data.

1) Parameters relating to the wafer:
OFfset-range of the alignment pattern distorting right and left/up and down.
SCaling-range of the pattern over the wafer enlarged right and left/up and down due to a lens.
W ROTation-range of an axis of the alignment pattern deviated with respect to the reference axis of the alignment.
ORThogonality-range of the wafer alignment axes mutually deviated with each other.

2) Parameters relating to the reticle
Reticle ROTation-range of the axis of the alignment pattern deviating against the reference axis of the alignment owing to the inaccurate setting of the reticle.
Reticle REDuction-range of the pattern over the wafer enlarged right and left/up and down owing to the inaccurate setting of the reticle.

As shown in FIG. 3, the photolithography system 40, i.e., the stepper, includes a wafer stage 42, a lens system 44, a reticle 46 and a light source system (not shown). Once the light of the light source system is radiated over wafer W via a mask pattern of the reticle 46 and the lens system 44, the mask pattern of the reticle 46 is reducibly projected on the wafer.

Therefore, the wafer alignment requires the correction upon wafer W replaced on the wafer stage 42 associated with the X-axis and Y-axis deviation, rotation, orthogonality and so on, and the correction upon the image projected on the wafer right and left. The reticle alignment requires the correction of the rotation and reduction of the reticle 46.

Consequently, the overlay measurement instrument 20 provides 10 measurement parameters such as OF-X, OF-Y, SC-X, SC-Y, ORT, W-ROT, RED-X, RED-Y, ROT-X and ROT-Y to the overlay correction value controller 30 together with the measuring time and lot IDs.

The overlay correction value controller 30 executes the ALMS-NN algorithm for predicting a correction input value x(n) of the photolithography apparatus, i.e., stepper. The overlay correction value controller 30 predicts the apparatus input value in view of the ALMS-NN algorithm to supply data as shown in FIG. 5 to the stepper 14. The data supplied to the stepper 14 includes a generating time and FWD data, RET data, NN data and IN data for each lot ID.

Here, FWD data denotes a step error value of a KEY layer, RET data are the bias data, and NN data are output values computed in a neural network. Also, IN data denote the apparatus correction values, i.e., apparatus input value.

ALMS-NN Algorithm

First, in order to minimize the measurement error in the photolithographic process, an algorithm capable of predicting an input value x(n) of the apparatus is necessary. The input value x(n) obtained from a database of a correction system shows an arbitrariness, which cannot be approximated by any interpretable function.

Figure 6:
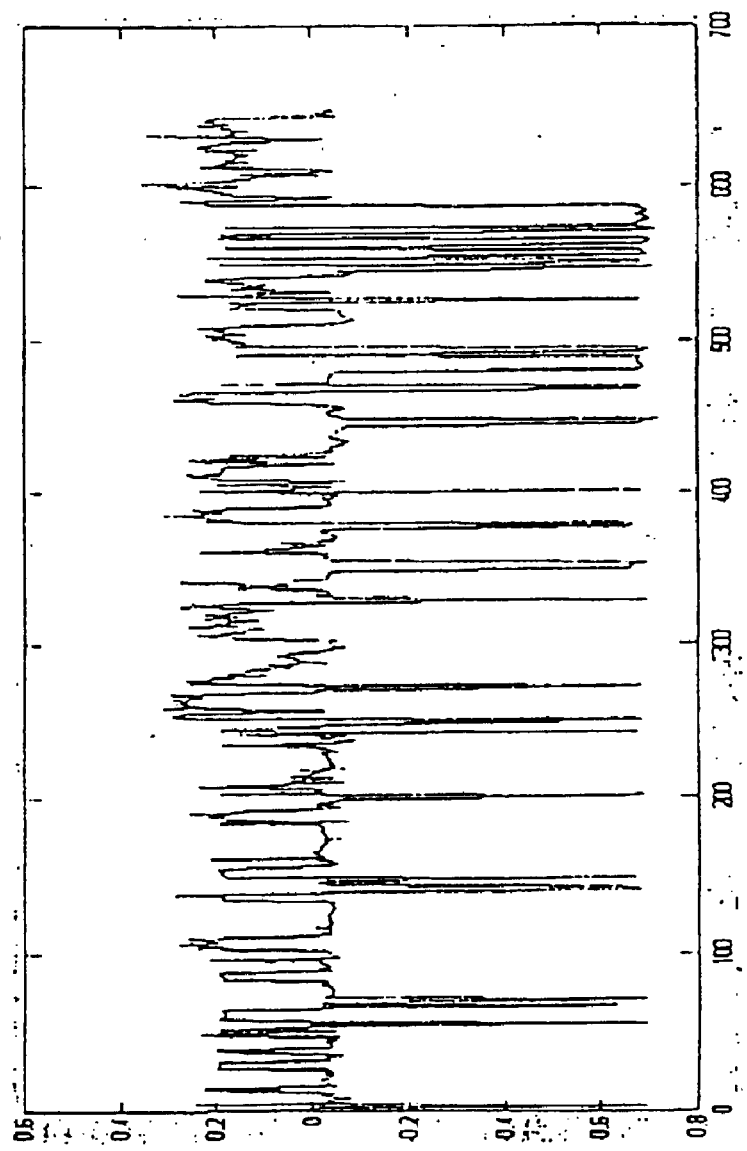
FIG. 6 is a graph representing the variation of the correction value of the stepper in accordance with the lapse of time.
Figure 7:
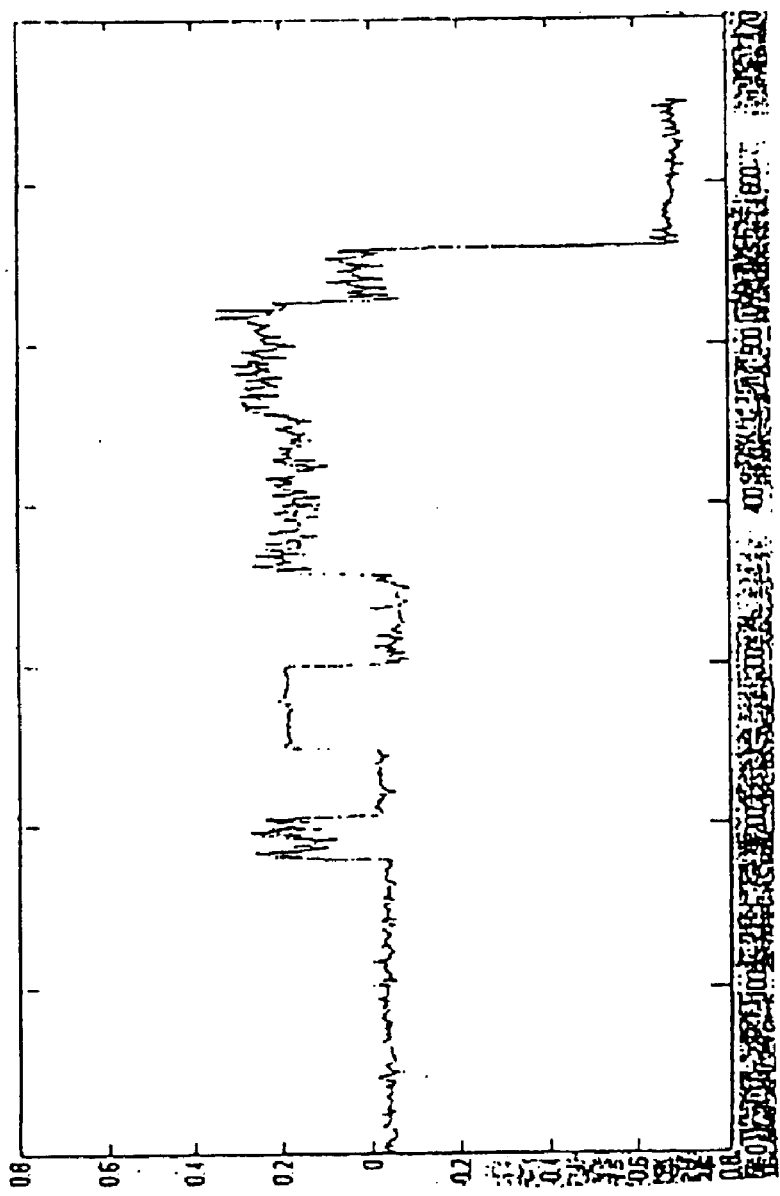
FIG. 7 is a graph representing a state of rearranging the correction values of FIG. 6 per identical history.

FIG. 6 plots a graph representing the apparatus input value with respect to the offset-x that is one of the apparatus correction values in the sequence of time selected as a sample among the data of 650 lots of the photolithography apparatus. FIG. 7 represents the arrangement of the apparatus input values of FIG. 6 for each lot having the identical history, and FIG. 8 shows the values obtained after subtracting the bias values from the apparatus input values.

Figure 8:
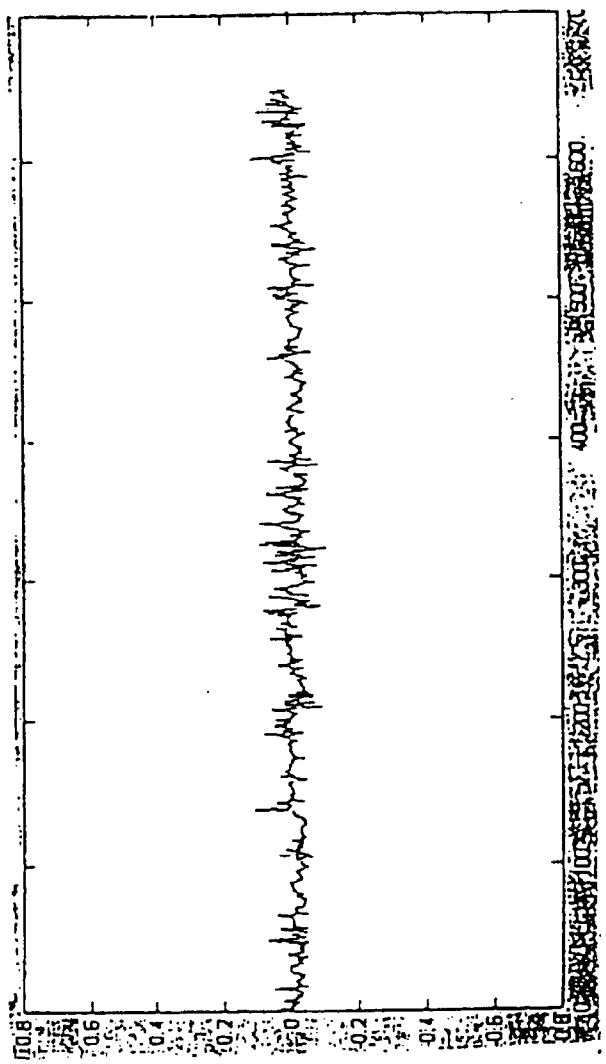
FIG. 8 is a graph showing a state of subtracting the mean value (bias value) of identical history from the correction values of FIG. 7.

As shown in FIGS. 6, 7 and 8, it can be noted that apparatus correction value x(n) closely relates to the history of corresponding lot, and a specific bias is applied for each identical history.

The reason for differences in the apparatus input values for identical history is due to the action of several factors which include the error of the pattern marked on the reticle and differences in the characteristics of the photolithography apparatus such as BASE I and BASE II.

Figure 9:
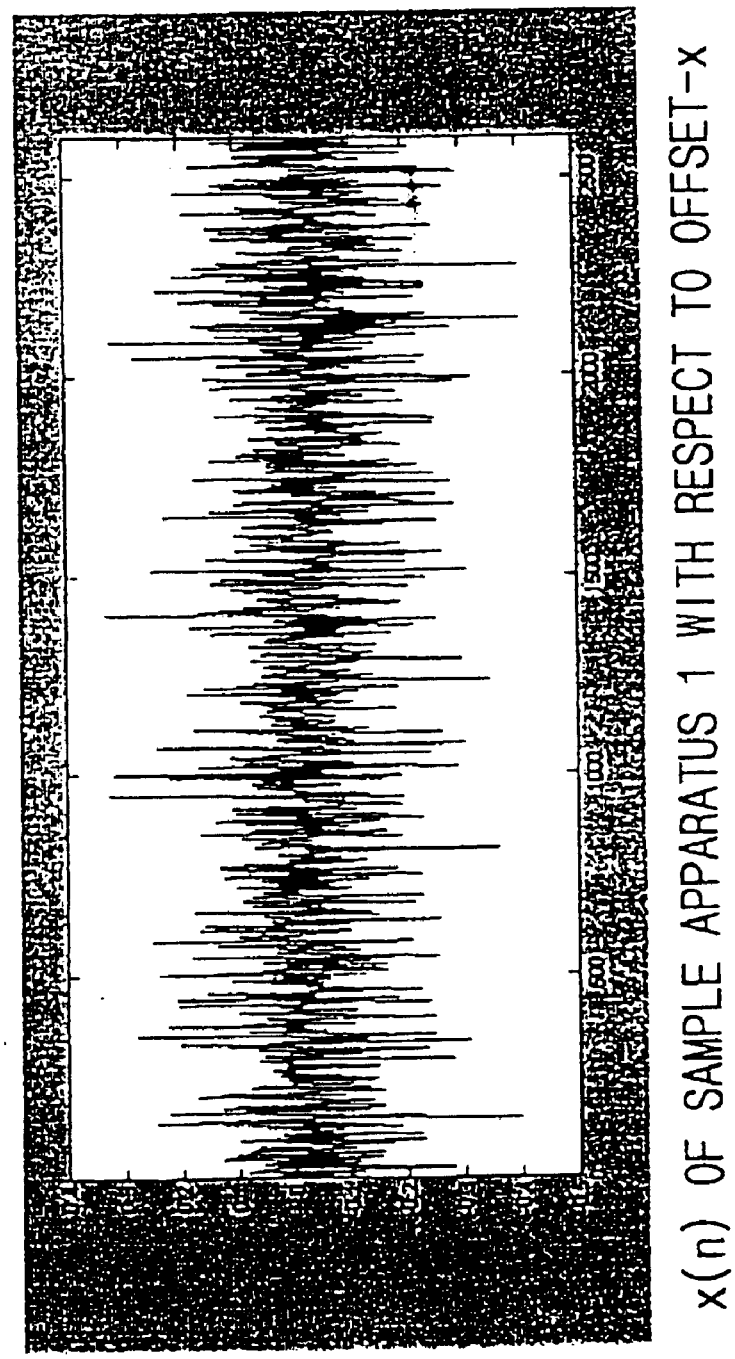
FIG. 9 is a graph representing the varied conditions of the correction values according to the time with respect to the OFFSET-X of the stepper.

Accordingly, it can be understood that, as shown in FIG. 9, the apparatus input value has an arbitrariness incapable of being approximated by any interpretable function.

Figure 10:
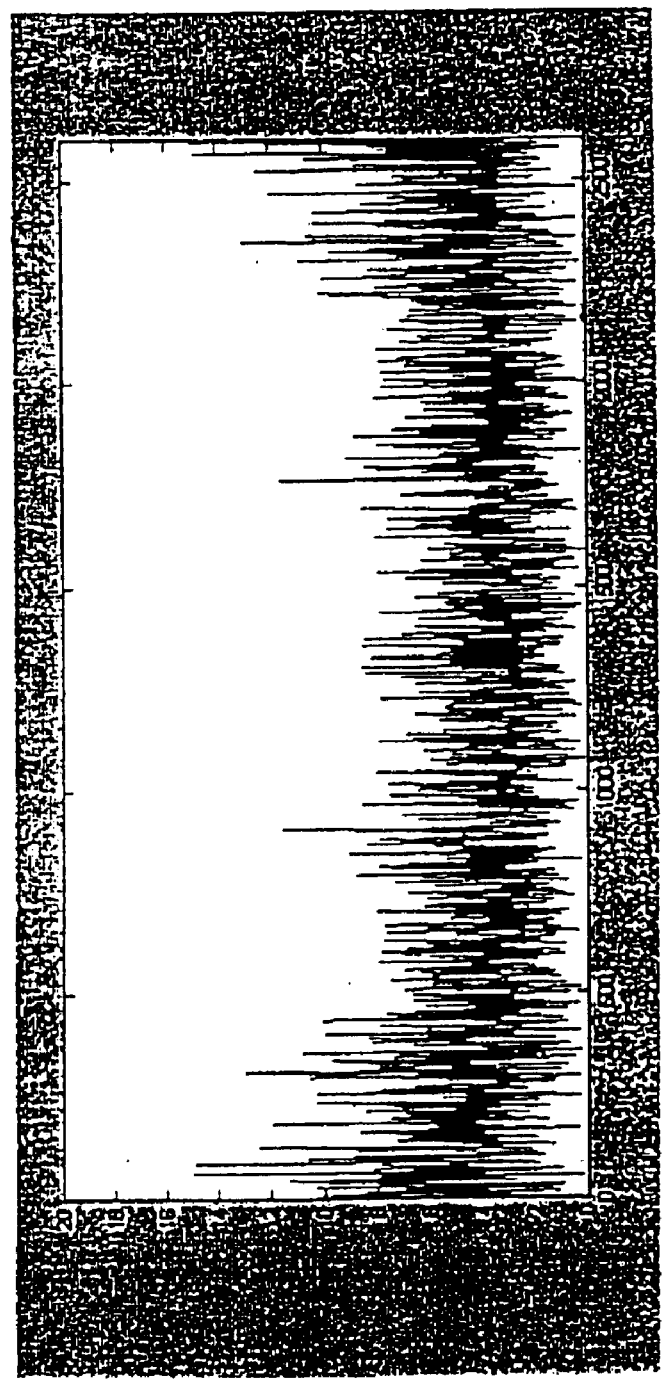
FIG. 10 is a graph representing the frequency spectrum of the correction value of FIG. 9.

As can be noted in FIG. 10, it is quite difficult to approximate the apparatus correction value x(n) to an interpretable function because it displays a signal characteristic having a frequency spectrum similar to white noise consistently distributed throughout the overall frequency band. Such an arbitrary property of the apparatus correction value x(n) becomes a major factor that makes it difficult to predict the apparatus correction value x(n) for minimizing the measurement error of the overlay measurer instrument.

However, not all variation factors of the apparatus correction value x(n) have random elements with unknown reasons. A bias portion correlated with the history of a corresponding lot is capable of being effectively predicted to some degree.

In the ALMS-NN algorithm, the apparatus correction value x(n) is divided into a bias component $x_{bias}(n)$ correlated with history and a RAND component $x_{rand}(n)$ with a random property of which a reason for variation cannot be definitely perceived. Here, $x_{bias}(n)$ is predicted on the basis of the history of the corresponding lot.

It is nearly impossible to accurately predict the RAND component which impedes the ability to definitely predict the $x_{bias}(n)$ due to its random property. Only its variation is tracked by using a feedback propagation learning capability of the neural network to minimize the prediction error of $x_{bias}(n)$.

As the $x_{rand}(n)$ component has a state of eliminating the correlation with the history of the corresponding lot, all data can be utilized regardless of the history of the corresponding lot.

Therefore, if the temporal variation of the history is not so large, the restriction of expiration time for using data, having been a problem in the traditional correcting system, can be solved. Also, even when the external factors affecting x(n) in addition to the history of the corresponding lot are varied, it can be effectively managed by using the learning capability inherent to the neural network.

1. Method for predicting $x_{bias}(n)$ (1) When an identical history exists:

The simplest way of predicting $x_{bias}(n)$ is by utilizing a mean value of the apparatus input values with respect to the lots having the past identical history. We assume that the currently available past apparatus correction values of lots having a certain identical history are denoted by $x^{sh}(m)$ (where m=1, 2, . . . and n) and an $x_{bias}$ value with respect to this history is determined by a constant. Then, $x^{sh}(m)$ can be represented by $$x^{sh}(m) = x_{bias} + x^{sh} \, rand \, (m)$$

At this time, assuming the complete randomness of $x^{sh}(m)$, $$\text{since } \lim_{n \to \infty} \left( \frac{1}{n} \sum_{m=1}^{n} x_{rand}^{sh}(m) \right) = 0,$$

$$\lim_{n \to \infty} \left( \frac{1}{n} \sum_{m=1}^{n} x^{sh}(m) \right) = x_{bias} + \lim_{n \to \infty} \left( \frac{1}{n} \sum_{m=1}^{n} x_{rand}^{sh}(m) \right) = x_{bias}$$

As a result, it can be noted that the mean value of $x^{sh}(m)$ serves as an effective estimator with respect to $x_{bias}$.

However, when it is considered in detail that the perfect randomness of $x^{sh}{}_{rand}(m)$ cannot be expected, and the factors such as the errors caused by the change of the BASE I apparatus or BASE II apparatus and the frequent changes of the reticle are considered, it is actually unreasonable to regard the $x_{bias}$ value with respect the identical history lots as a constant.

Therefore, in the ALMS-NN algorithm proposed for considering such variable factors, $x^{sh}(m)$ for predicting $x_{bias}$ is obtained by using a section linear weighted means without using a simple arithmetic mean.

$$x_{bias} = \frac{1}{W} \sum_{i=n-W+1}^{n} \left[ \frac{W+n-1}{\sum_{j=1}^{W} i} x^{sh}(i) \right]$$

where $x_{bias}$ denotes the bias correction value, W is a section, and $x^{sh}$ is the previous bias correction value having the identical history.

(2) When no identical history exists:

If $x_{bias}$ is predicted by using the sorting of the identical history data and the section linear weighted mean, a problem occurs when a lot with no identical history is to be processed, owing to the restricting condition with respect to the history.

In case of a new device having never been processed, the sampling process for securing new data is unavoidable. However, when the foregoing section linear weighted mean cannot be utilized because of a difference in the Base I apparatus, Base II apparatus, or PPID, among the factors constituting the history, $x_{bias}$ can be predicted via the following methods.

The reason for involving the difference in the apparatus input values in accordance with the history even in case of the identical devices is undoubtedly the characteristic difference of respective factors that constitute the history. Therefore, $x_{bias}$ may be divided into components by respective history constituting factors, e.g., PPID, BASE I, Base II and Reticle. If the mutual correlation of these constituting factors is not considered, $x_{bias}$ may be defined as $$x_{bias} = x^{PPID}{}_{bias} + x^{BASEI}{}_{bias} + x^{BASEII}{}_{bias} + x^{RET}{}_{bias}$$

where $x^{PPID}{}_{bias}$, $x^{BASE\ II}{}_{bias}$, $x^{BASE\ I}{}_{bias}$, and $x^{RET}{}_{bias}$ denote the bias components respectively corresponding to the PPID, BASE I, BASE II and Reticle. While the most greatly affecting component is $x^{RET}{}_{bias}$ by the reticle that becomes the base of the photolithographic process, the influence of the other components may be regarded as relatively slight. Consequently, if no identical history exists, the influence except for $x^{RET}{}_{bias}$ is understood in the order that $x^{PPID}{}_{bias} > x^{BASE\ I}{}_{bias} > x^{BASE\ II}{}_{bias}$.

If no identical history exists, two methods to be described below are utilized to predict respective components.

The description upon respective methods will be provided from the high ranking of application. Then, the history is to be displayed in the order from the PPID, BASE I, BASE II to Reticle. It would be acceptable to guess the other components by a proper method.

(a) Guessing $x_{bias}$ using the relative values of BASE II, BASE I or PPID:

It is assumed that the history H1 of a lot currently intended to predict its $x_{bias}1$ and previous history data H2, H3 and H4 are written as below:

H1={P1, BI1, BII2, R1}, $x_{bias}1$

H2={P1, BI1, BII3, R1}, $x_{bias}2$

H3={P2, BI4, BII2, R1}, $x_{bias}3$

H4={P2, BI4, BII3, R1}, $x_{bias}4$

Here, H1 and H2 are different by BII2 and BII3 while the remaining history constituting factors are the same. Similarly, H3 and H4 are different by BII2 and BII3 with the same remaining factors.

$x_{bias}1$ with respect to history H1, currently intended to be predicted, may be predicted as below:

$$x_{bias}1 - x_{bias}2 = x_{bias}3 - x_{bias}4$$

Therefore, it is guessed that $x_{bias}1 = x_{bias}3 - x_{bias}4 + x_{bias}2$.

It is guessed in the order from BASE II, BASE I to PPID exerting the slightest influence.

Because the influence of $x^{RET}{}_{bias}$ component exerting upon $x_{bias}$ is far stronger than those of the other components, only those H1, H2 and H3 having the identical reticle component with that of H1 should be considered.

(b) Guessing Of $x_{bias}$ using the mean value of the histories that are different solely by BASE II or BASE I:

It is assumed that the history of the lot with $x_{bias}$, which is to be currently predicted, is written as H={P, BI1, BII2, and R}. Also, it is supposed that m-numbered history data H1~Hm only different in view of H and BASE II exist, and $x_{bias}$ corresponding to respective data are $x_{bias}1 \sim x_{bias}m$. Then, it is predicted by the mean value as the following equation.

$$x_{bias} = \frac{1}{m} \sum_{i=1}^{m} x_{bias}(i)$$

(3) When $x_{bias}$ cannot be predicted:

If no identical history data with respect to the lot intended to be currently subjected to the processing exist while the above guessing method (2) cannot be applied, the sampling processing is inevitably executed.

2. Method for tracking $x_{rand}$

The main factor affecting the apparatus input value becomes the history of each lot. All random components except $x_{bias}$ value that can be predicted from correction value $x(n)$ via the history are included in $x_{rand}$.

Because such $x_{rand}$ value has a state of eliminating the dependence of the data upon the history of the corresponding lot, it may be considered as displaying the characteristic variation in accordance with the time of the apparatus itself due to several external reasons.

However, since the factor that varies $x_{rand}$ value in the lapse of time has not been exactly investigated up to now, it is difficult to predict the $x_{rand}$ value.

One effective method applicable in this circumstance is to track the variation of $x_{rand}$ by using the neural network.

In the currently applied correction system, only the data within a considerably limited period are utilized among the data with respect to the lots having the identical history for considering several variation factors including the change of such apparatus characteristics. However, such restriction particulars actually incite problems in the processing management, so that the variation factors are separately considered independently from the history to complement the disadvantages of the traditional system for heightening the efficiency in the processing management.

Figure 11:
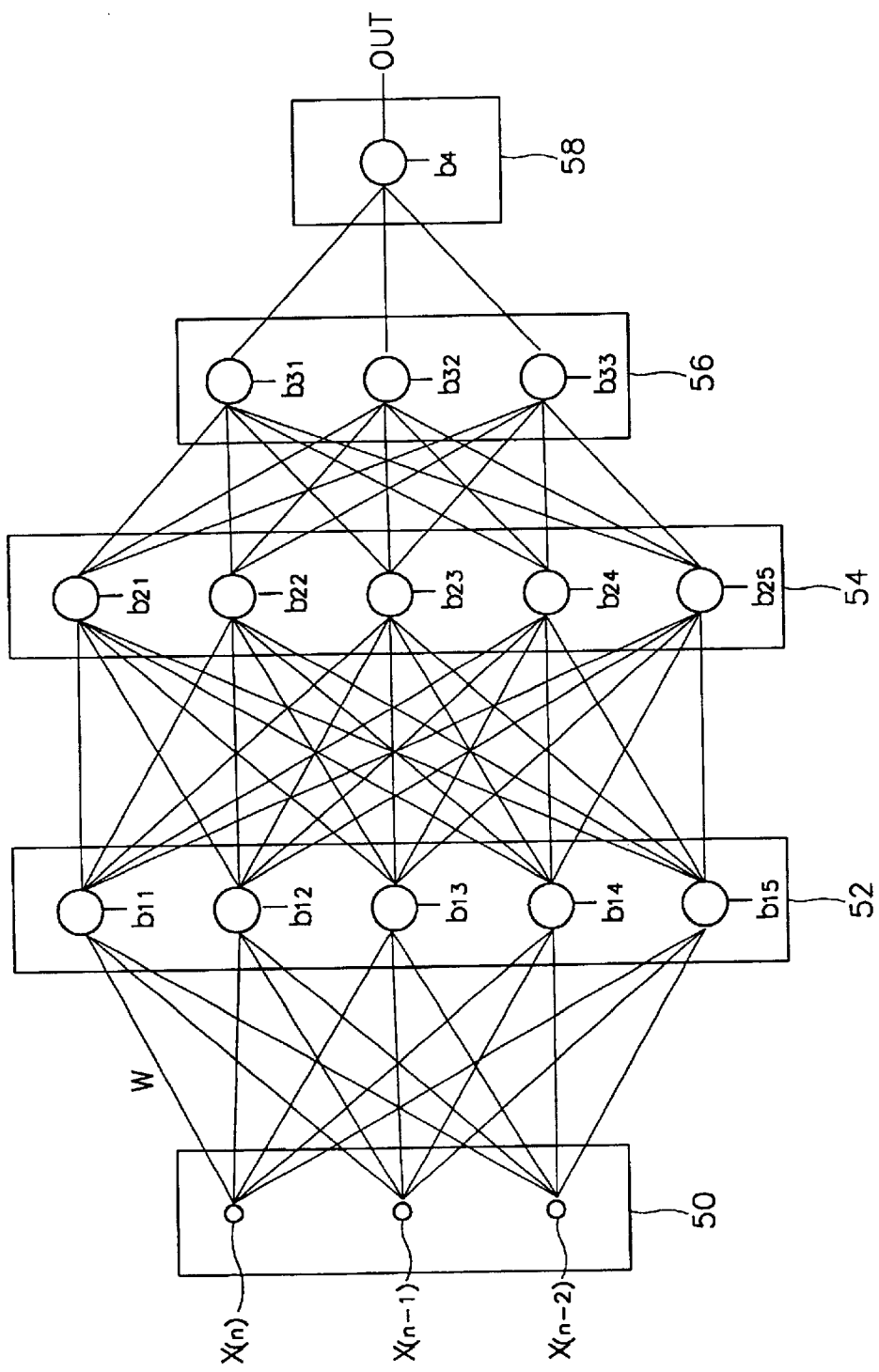
FIG. 11 is a view showing one example of a neural network according to the present invention.

A neural network employed for tracking $x_{rand}$ is, as shown in FIG. 11, a multilayer perceptron having an input layer 50 including three input neurons, an output layer 58 including one output neuron and three hidden layers 52, 54 and 56 respectively formed by five, five and three neurons. The employed learning method of the neural network is of the most general error feedback propagation system.

The network connection is in the direction of the input layer 50, the hidden layers 52, 54 and 56 and the output layer 58, which is of the feed forward network involving no direct connection within respective layers and from the output layer 58 to the input layer 50.

In the error feedback propagation learning method employed in the ALMS-NN algorithm, once an input pattern is applied to respective nodes of the input layer 50, this signal is converted at respective nodes to be transferred to the hidden layers 52, 54 and 56, thereby being finally provided to the output layer 58. By comparing the output value and an expectant value, a connection strength (weight) w is adjusted in the direction of decreasing the difference, which is propagated back from the upper layer to make the lower layer in turn adjust its connection strength w based on the feedback.

The system output through the feed forward path of the neural network is written as follows:

$$a^{m+1} = f^{m+1}(w^{m+1}a^m + b^{m+1})$$

where m equals 0, 1, ... and M−1, and a denotes the outputs of respective neurons. Also, b denotes the bias, f is a transfer function, and w is the weight. Here, M denotes the number of layers of the neural network.

In the error feedback propagation algorithm of the multilayer perceptron, an error by the expectant value and difference is defined as:

$$F(X)=(t(k)-a(k))^T(t(k)-a(k))=e(k)^T e(k)$$

where the reference alphabet F denotes an error squared, X is the weight and bias vector of the neural network, and t is the expected output value.

Here, the approximated most abrupt drop algorithm expressed by a matrix is as below:

$$w^m(k+1)=w^m(k)-as^m(a^{m-1})^T \quad b^m(k+1)=b^m (k)-as^m$$

where the variation of F is set as the sensitivity, which is expressed by a matrix $$s^m=F^m n^m(w^{m+1})^T s^{m+1}$$

The sensitivity starts from the last layer of the neural network to be propagated backward to the first layer as follows:

$$s^m \to s^{M-1} \to \ldots \to s^2 \to s^1$$

Here, the sensitivity of the first stage is written as the following equation.

$$s=-2F^M (n^M)(t-a)$$

The input/output relation as expressed below is considered for tracking the variation of $x_{rand}$ by using the neural network.

$$x_{rand}(n)=f(x_{rand}(n-1), x_{rand}(n-2), x_{rand}(n-3))$$

That is, the neural network produces the predicted value of the current $x_{rand}$ value with reference to three data of the latest $x_{rand}$ values. The produced predicted value permits the output of the neural network to track the variation of the $x_{rand}$ value via a process of making the neural network study in the direction of decreasing the error from the value actually measured subsequently by the overlay measurement instrument.

A sigmoid function expressed as the following equation is employed as the transfer function of the neurons of hidden layers 52, 54 and 56:

$$\phi(v) = \frac{1}{1+\exp(-\alpha v)}$$

The linear function is used as the transfer function of the output neuron.

While the hidden layers are provided for increasing the generalizing capacity and learning ability of the neural network, it is known that the number of the hidden layers and the performance of the neural network necessarily have a proportional relation, and employing greater than three hidden layers hardly assists in improving the performance of the neural network.

Figure 12:
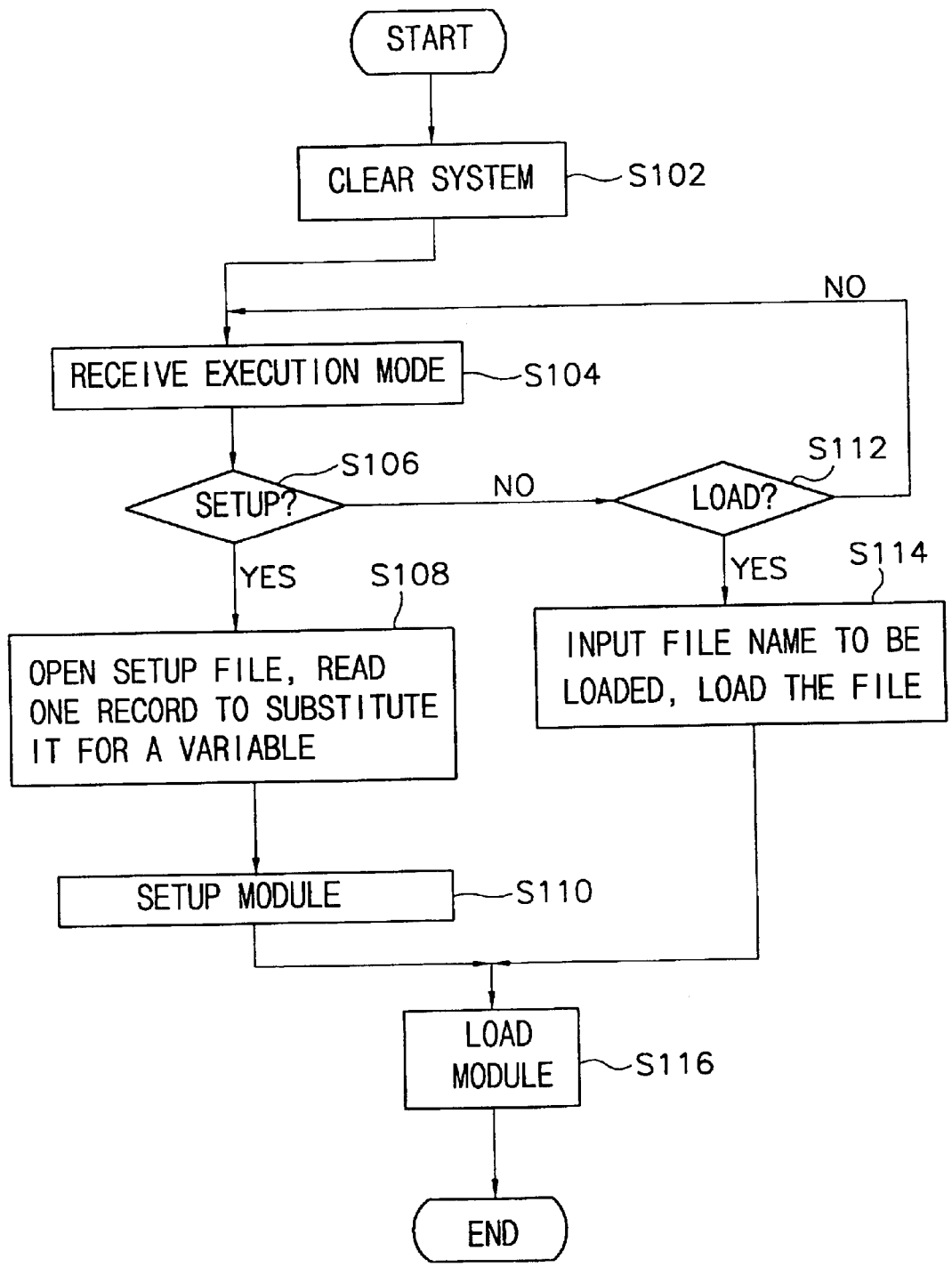
FIGS. 12 to 20 are flowcharts for illustrating the operation of predicting the correction value of the overlay correction controller according to the present invention.

3. Method for generating the photolithography apparatus input value and the learning method of the neural network Referring to FIG. 12, the system according to one embodiment first initializes the ALMS-NN variants and neural network setup variants of the system (S102).

Successively, an execution mode is received (S104), and it is determined whether the input execution mode is a setup mode or a load mode (S106).

If in step S106 the mode is the setup mode, then a setup file is opened to read out one record, thereby substituting the record for the respective initialized variants (S108). Then, a setup module is carried out (S110).

If in step S106 the mode is not the setup mode, then it is checked whether the mode is the load mode or not (S112). When step S112 is the load mode, a load file name is input to load the file (S114).

After performing step S110 or S114, a load module step is performed (S116).

Figure 13A:
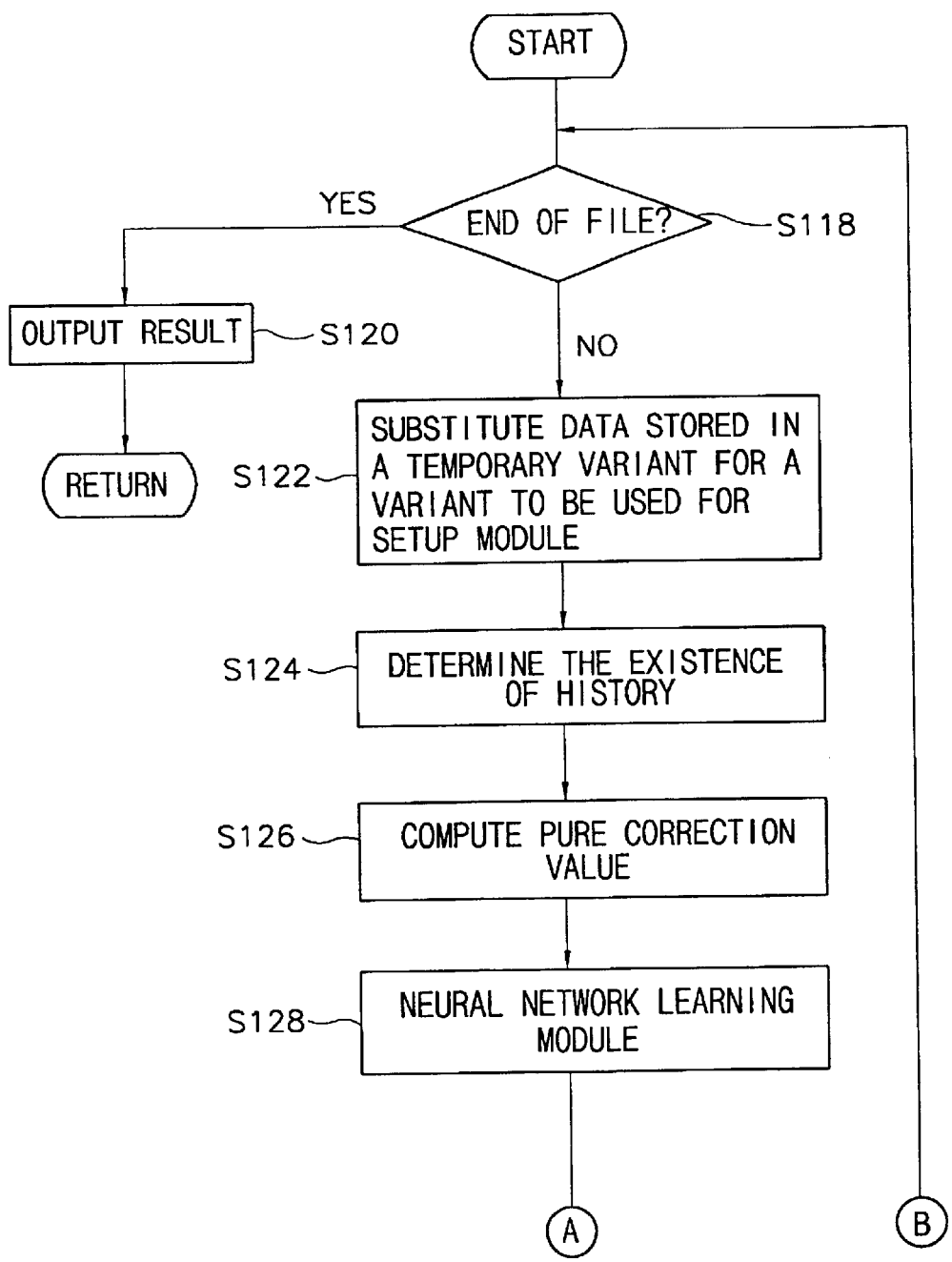
Figure 13B:
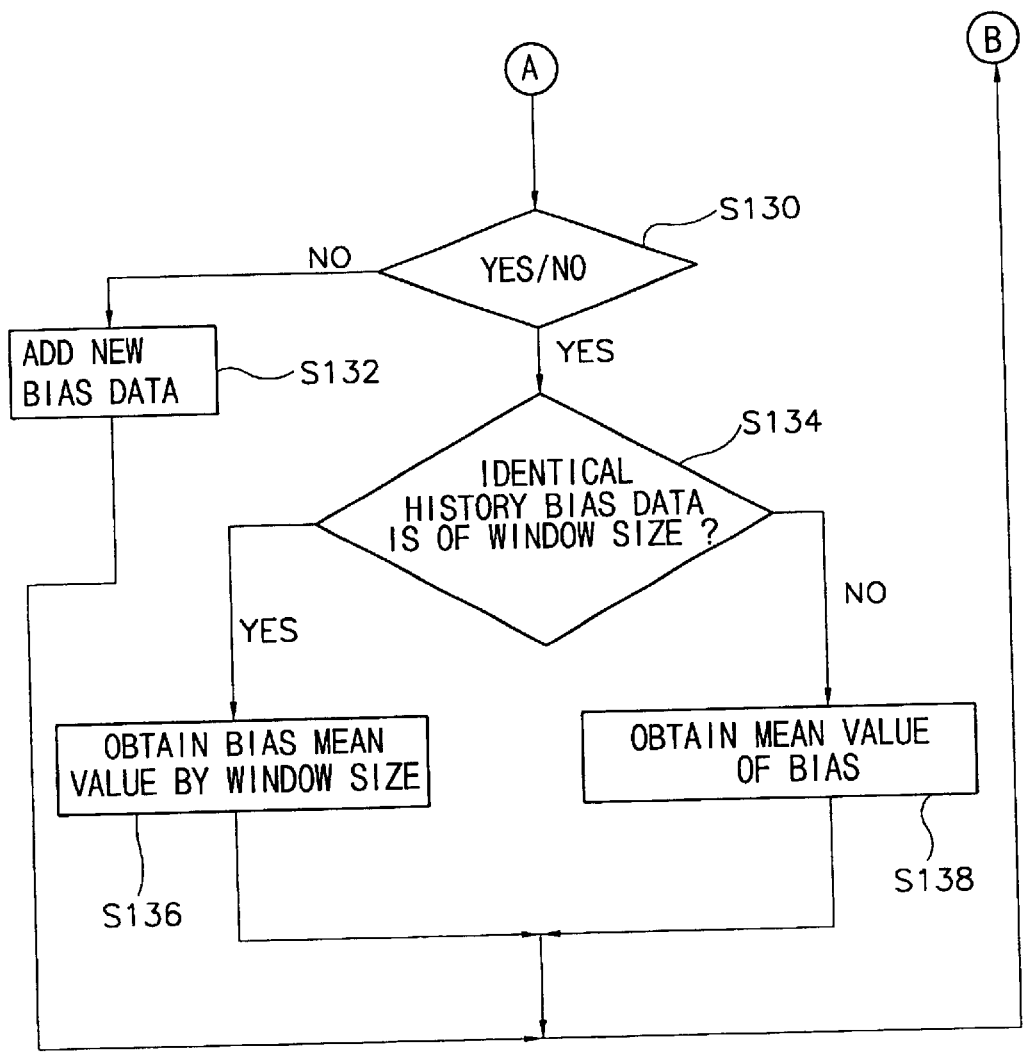

FIGS. 13A and 13B illustrate steps in an embodiment of the setup module. Referring to FIGS. 13A and 13B, the setup module checks whether the setup file is at the end or not. If it is ended, the result is output (S120) to return to the main program.

If step S118 is not the end of the setup file, the data stored in an optional variant is substituted for the variant that is to be used for the setup module (S122). Among the substituted variants, the values of the variants which are the history-consisting elements are used for searching whether the identical history data exists or not (S124). Then, an apparatus pure correction value is computed from the substituted variants (S126) to carry out the neural network-learning module (S128).

Next, it is determined whether or not identical history data for the currently learned data exists (S130).

When no identical history of the currently learned data exists, new bias data are added (S132) and then step S118 is performed again.

When the identical history data exists in step S130, it is determined whether the identical history bias data is of a window size or not (S134). When it is of the window size in step S134, the bias mean value is obtained by the window size (S136) and step S118 is performed again. If it is not of the window size in step S134, the mean value of the bias is obtained (S138) and step S118 is performed again.

Figure 14:
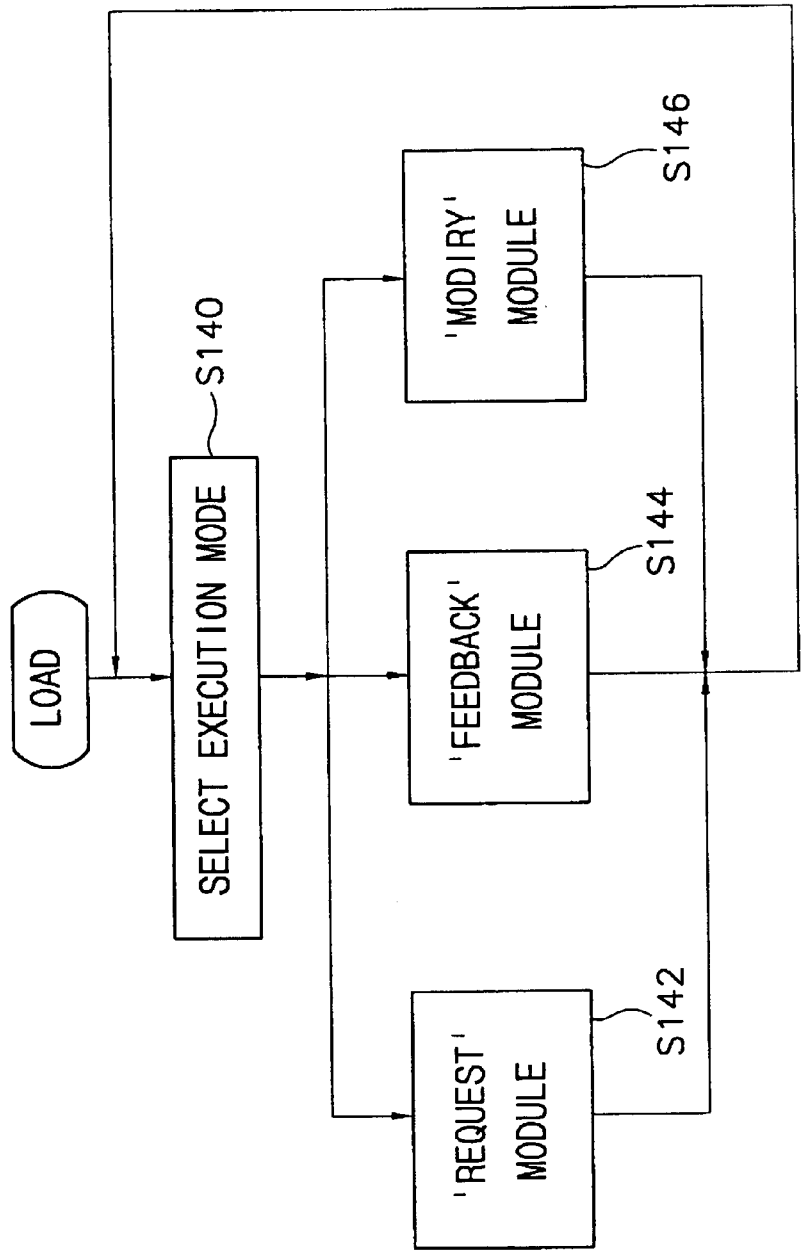

FIG. 14 illustrates steps in an embodiment of the load module. Referring to FIG. 14, an execution mode is selected in the load module (S140), and a request module S142, a feedback module S144 and a modify module S146 are respectively performed in accordance with the selected three execution modes.

Figure 15:
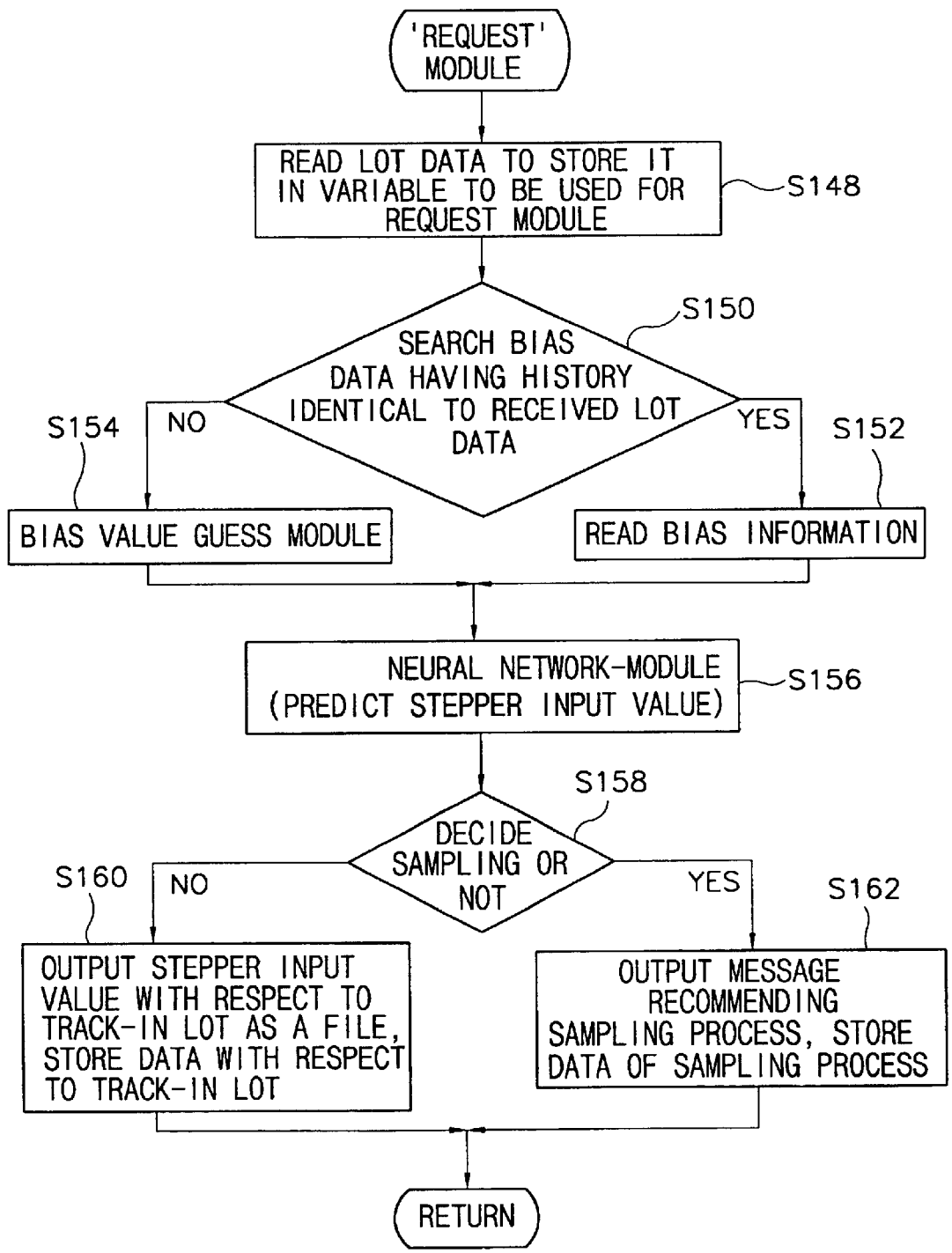

FIG. 15 illustrates steps in an embodiment of the request module. Referring to FIG. 15, in request module S142, the lot data are read out once a new lot is track-in to the apparatus to be substituted for the variant that will be used in the request module (S148). In the ALMS-NN algorithm, the history-constituting elements of the lot, i.e., PPID, Base I, Base II and Reticle are primarily confirmed and the data when processing the lots having the identical past history are searched out (S150).

When the identical history data exists, the latest 10 bias data are read out (S152) to obtain $\overline{x_{bias}}$ which is a predicted value of $x_{bias}$ with respect to the corresponding lot by the section linear weighted mean to the read out data.

If no identical history datum exists in step S150, a bias guess module is executed for obtaining $\overline{x_{bias}}$ by means of the two-step guess method described earlier (S154).

The neural network module is performed (S156) for predicting the bias value and RAND value in steps S152 and S154 to predict the apparatus input value.

Based on the latest RAND correction value, $\overline{x_{rand}}$ predicted by the neural network is obtained.

The final apparatus input value is determined by the following equation.

$\overline{i(n)} = \overline{x_{bias}} + \overline{x_{rand}} + f(n)$ where $f(n)$ denotes the feed forward input value.

In case of the orthogonality, since the correction value is provided as: $x(n) = i(n) + f(n) + e(n)$ differently from the other parameters, a slight difference is produced when predicting $x_{bias}$ or generating the input value.

Accordingly, the apparatus input value of the orthogonal component is expressed by $$\overline{i(n)} = \overline{x_{bias}} + \overline{x_{rand}} - f(n)$$

In order to learn the neural network, the measurement value of the already-fedback overlay measurer instrument. Providing that an ideal apparatus input, capable of making the measurement error of the measurement instrument with respect to a certain lot zero, is denoted by i(n), then a difference between $\overline{i(n)}$ and i(n) resultantly appears as the measurement error, which is written as follows:

$$x(n) = \overline{i(n)} - f(n) - e(n) = i(n) - f(n)$$

As a result, $\overline{i(n)} - i(n) = e(n)$, which is accordingly utilized in the error feedback propagation learning of the neural network.

In case of the orthogonal component, the feedback is performed upon −e(n) without allowing e(n) to feedback unchanged. Hence, $$x(n) = \overline{i(n)} + f(n) + e(n) = i(n) + f(n), \text{ so that } \overline{i(n)} - i(n) = -e(n)$$

If the bias value cannot be predicted prior to step S156, it is determined whether sampling is required or not (S158). When sampling is unnecessary, the input value with respect to the current lot is provided as a file to store the data (S160).

If it is determined in step S158 to require the sampling process, a message for recommending the sampling operation is displayed to store the sampling processing data (S162).

Figure 16:
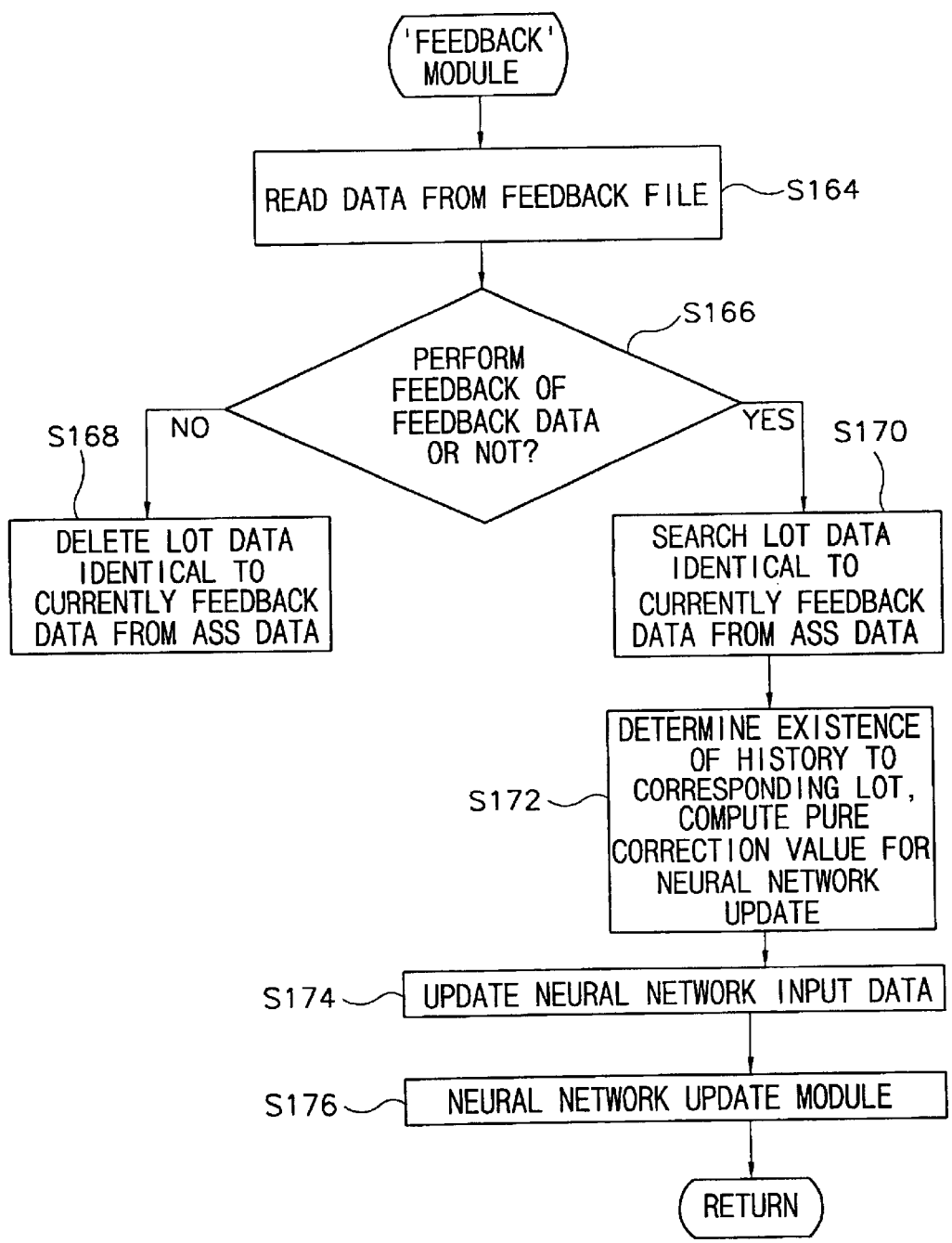

FIG. 16 illustrates steps in an embodiment of the feedback module. Referring to FIG. 16, in the feedback module, the data is read out from the feedback file (S164). It is determined whether or not the value of the feedback data exceeds the spec-in range by five times (S166). When it exceeds five times thereof, the data identical to the currently-fedback data is deleted from a temporary file data ASN-DATA (S168).

If it is smaller than five times thereof in step S166, the lot data identical to the currently-fedback data are searched from the ASN-DATA (S170). Then, it is determined whether the history with respect to the corresponding lot exists or not to compute the pure correction value for performing the neural network update (S172).

Successively, the neural network data are updated (S174), and the neural network update module is performed, thereby returning to the main program (S176).

Figure 17:
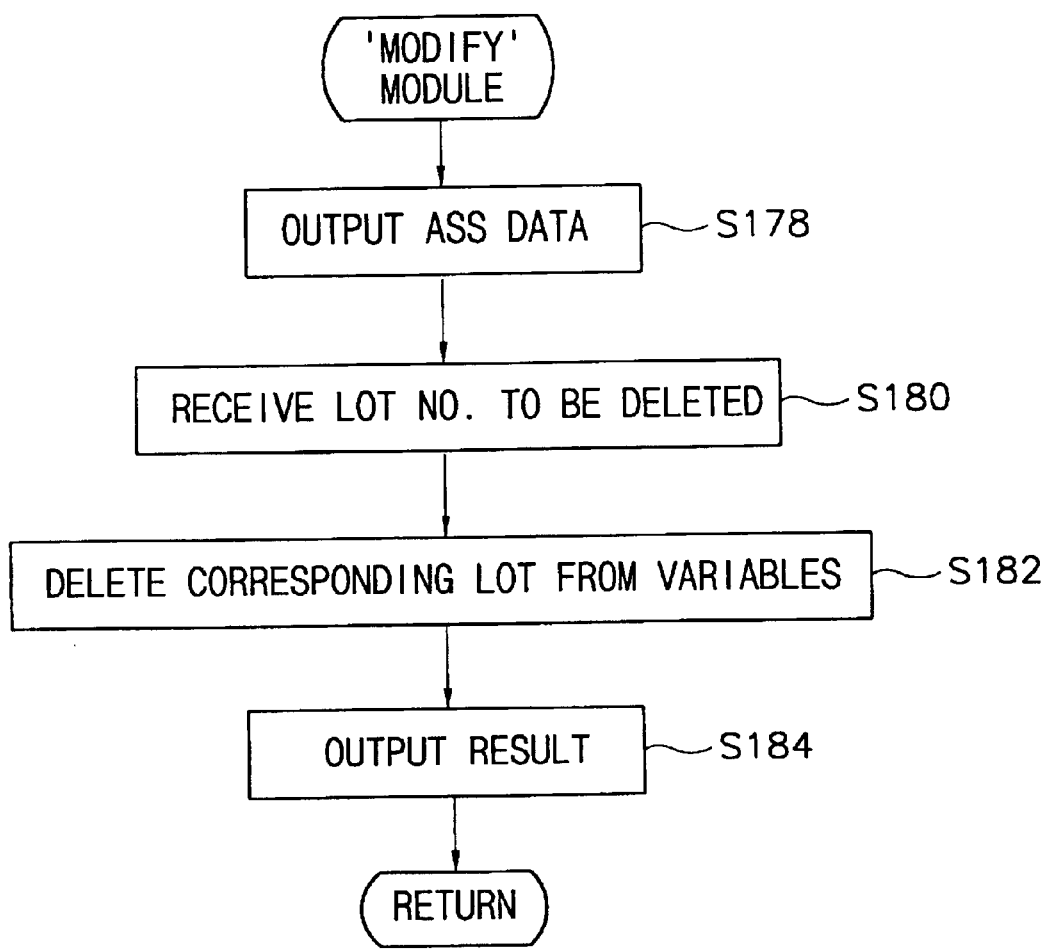

FIG. 17 illustrates steps in an embodiment of the modify module. Referring to FIG. 17, in the modify module, the ASN-DATA are provided to be displayed on the monitor (S178). By doing so, the lot number to be deleted by an operator is received (S180), the input corresponding lot variants are deleted from the ASN-DATA (S182), and the result of the deletion is displayed on the monitor (S184).

Figure 18A:
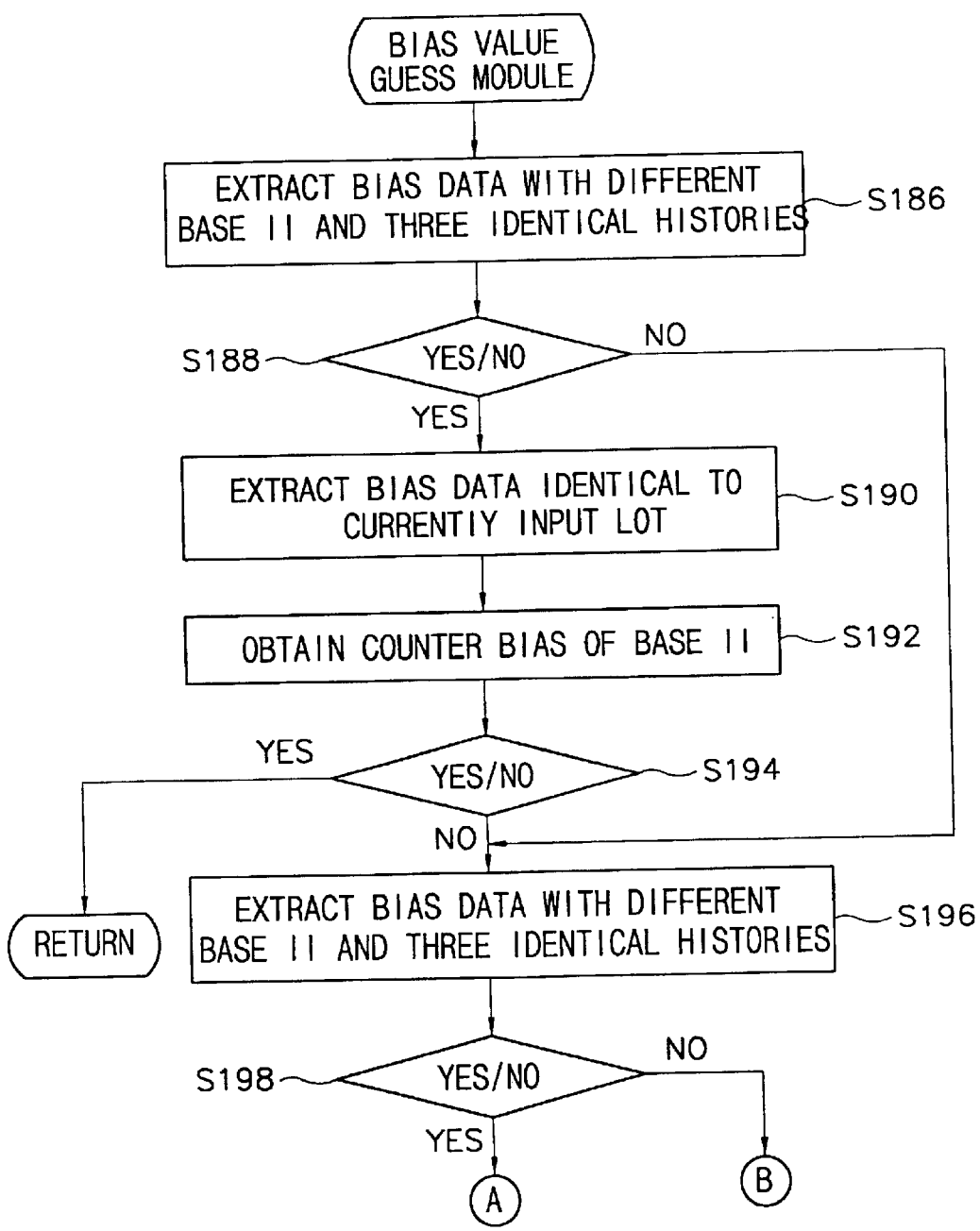
Figure 18B:
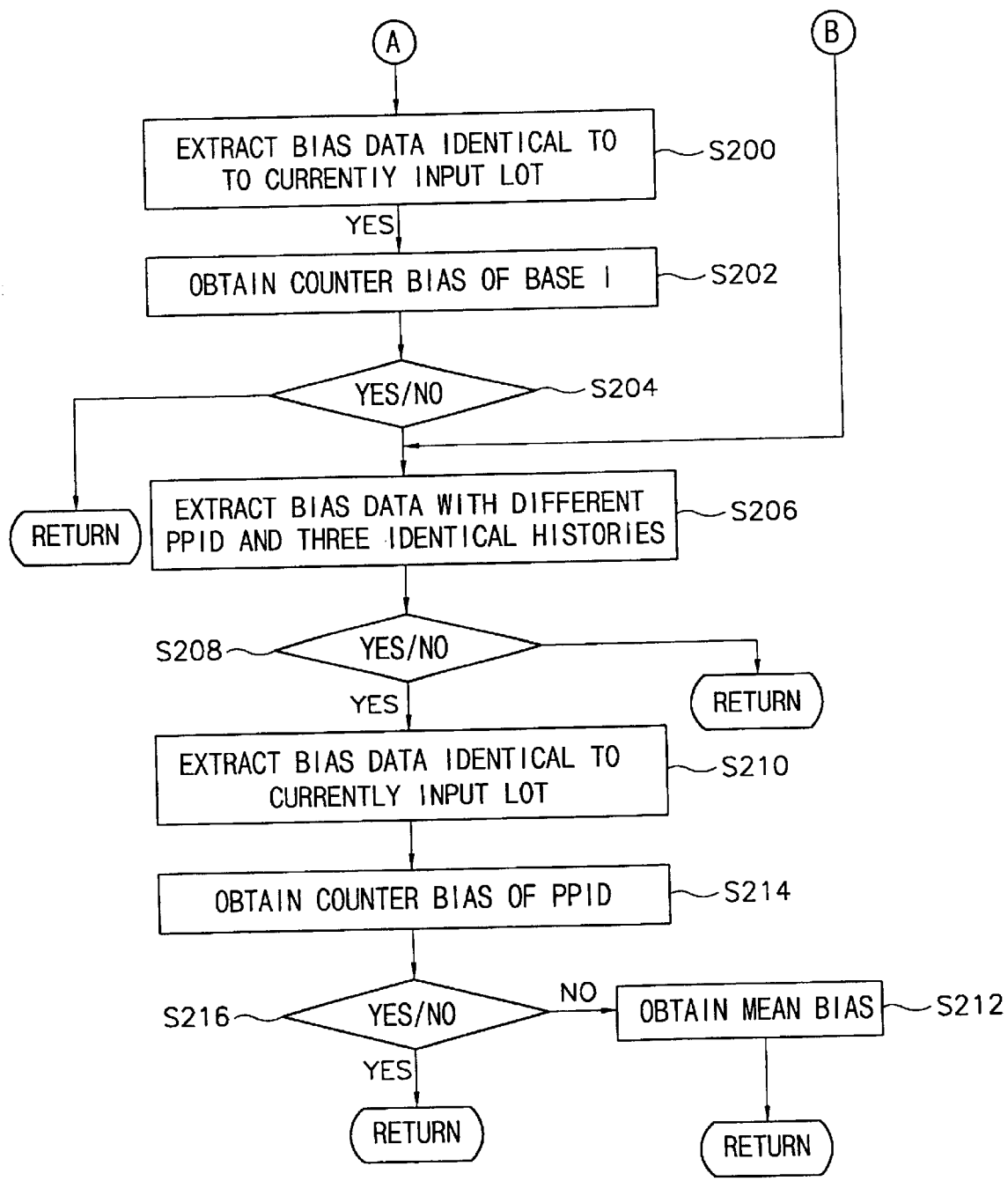

FIG. 18 illustrates steps in an embodiment of the bias value guess module. Referring to FIGS. 18A and 18B, the bias guess module extracts the bias data with different BASE II components exerting the least influence and the remaining three identical history constituting elements among the history constituting elements (S186). It is checked whether the data extracted in step S186 exists or not (S188). If the extracted data exists, the bias data identical to the current lot are extracted (S190). By combining the extracted bias data, the countering bias of the BASE II is obtained as described above (S192).

When the countering bias is obtained in step S192, the program is ended to return to the request module (S194). If the countering bias is not obtained in accordance with the aforementioned formula in step S192, or if no bias datum is extracted in step S188, the bias data with different BASE I and three identical history-constituting elements are extracted (S196).

It is checked whether the data extracted in step S196 exists or not (S198), and the bias data identical to the current lot are extracted in case of the existence (S200). Then, the extracted bias data are combined to obtain the countering bias of the BASE I as described above (S202).

When the countering bias is obtained in step S202, the program is ended to return to the request module (S204). If the countering bias is not obtained in step S202, or if no bias datum is extracted in step S198, then the bias data with different PPID and remaining three identical histories are extracted (S206).

The existence of the extracted data in step S206 is checked (S208). When the extracted data exists, the bias data identical to the current lot are extracted (S210). By combining the extracted bias data, the countering bias of the PPID is obtained as described above (S214).

When the countering bias is obtained in step S214, the program is ended to return to the request module (S216). If no countering bias is obtained by the above-described formula in step S214, the mean value of the bias data in which either one of the BASE II and BASE I is different and remaining three histories are identical is obtained (S212).

Figure 19:
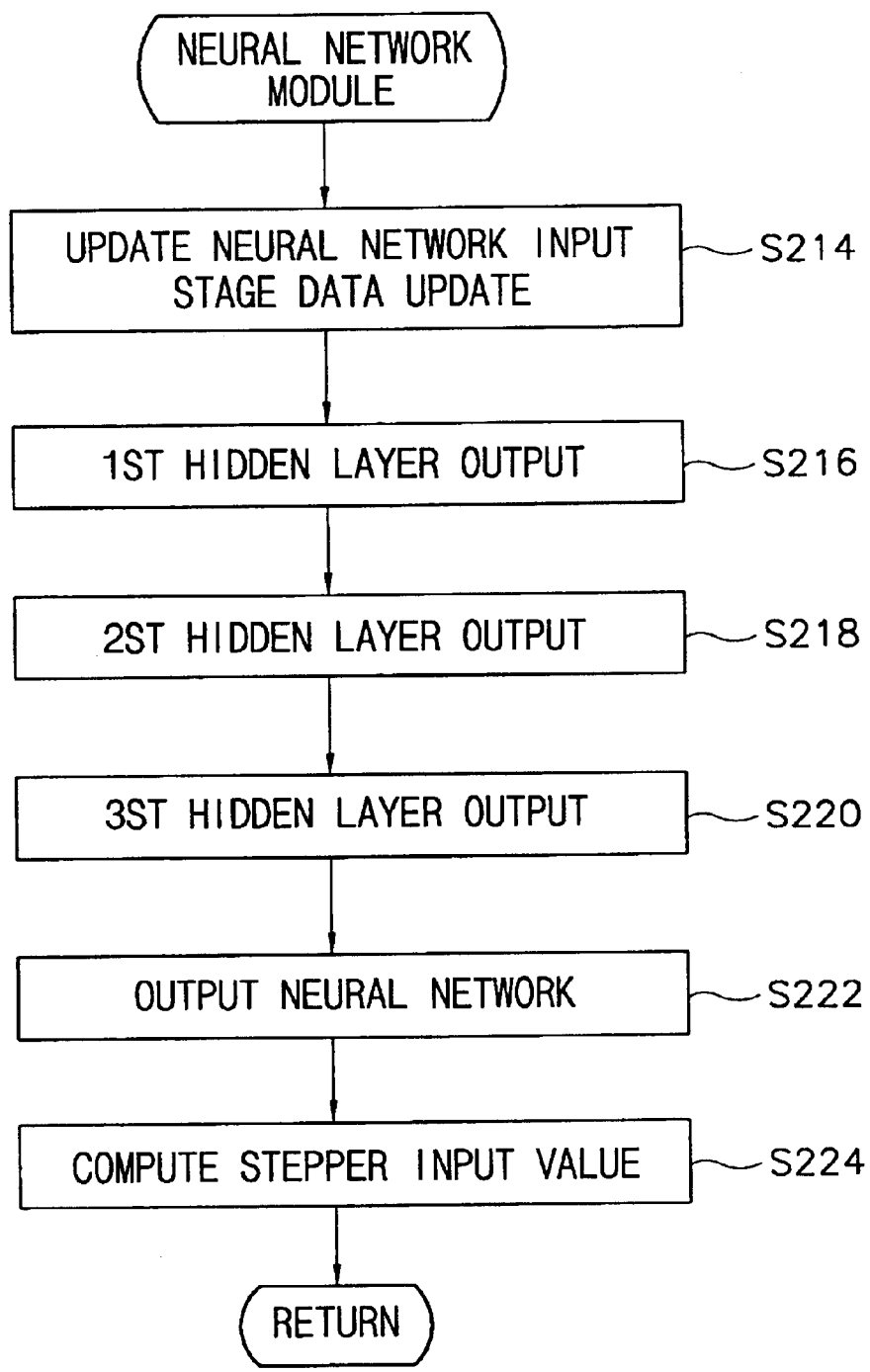

FIG. 19 illustrates steps in an embodiment of the neural network module. Referring to FIG. 19, the neural network module updates the input layer data of the neural network (S214), and the final output is produced from the output layer sequentially via first hidden layer output S216, second hidden layer output S218 and third hidden layer output S220 (S222). The apparatus correction value is computed by summing the produced RAND correction value and bias value (S224).

Figure 20:
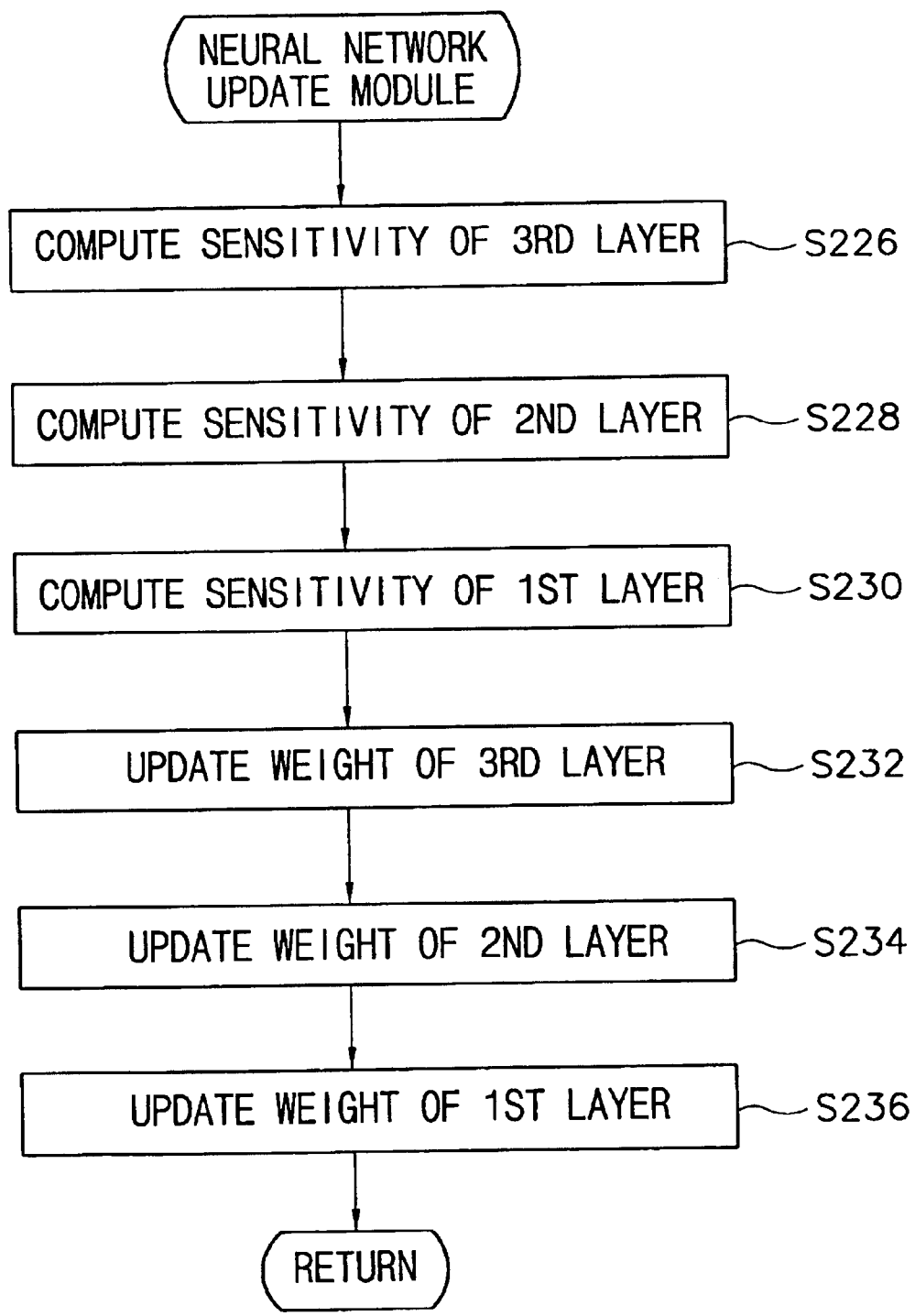
Figure 26:
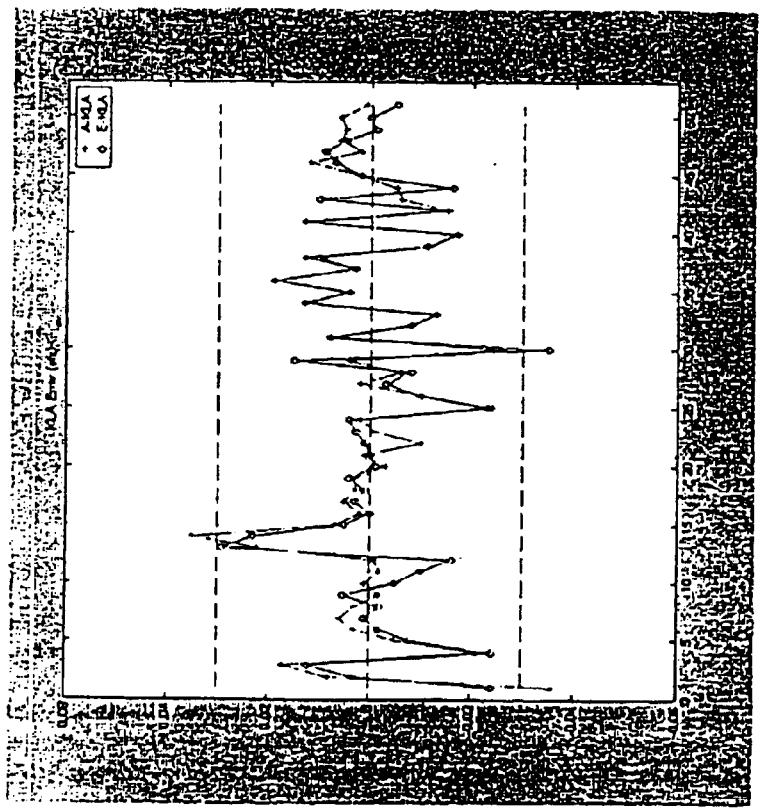
FIGS. 26 to 35 are graphs obtained by analyzing the result of applying the overlay correction-controlling algorithm according to the present invention to the actual apparatus.
Figure 27:
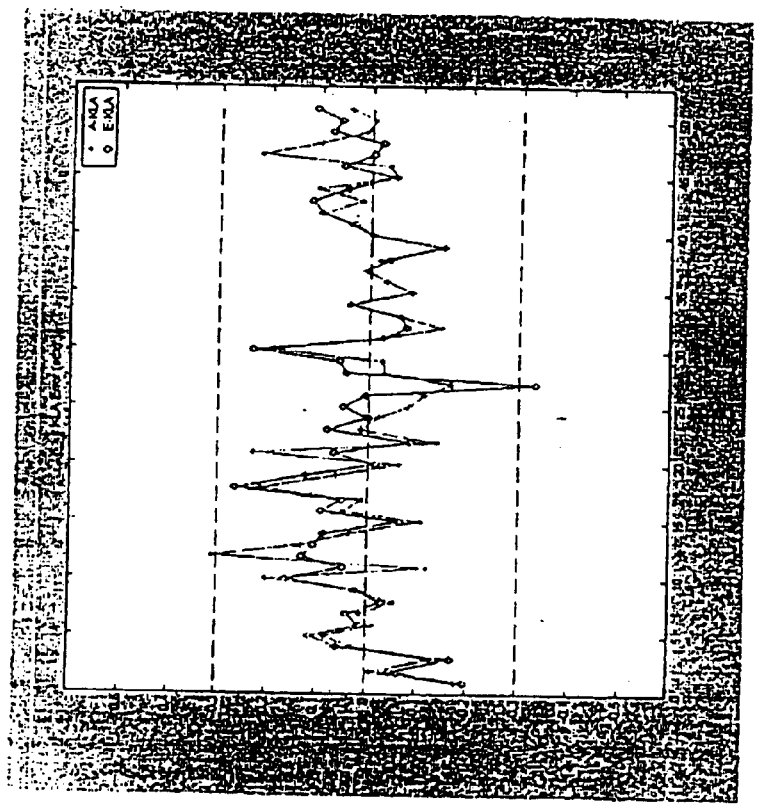
Figure 28:
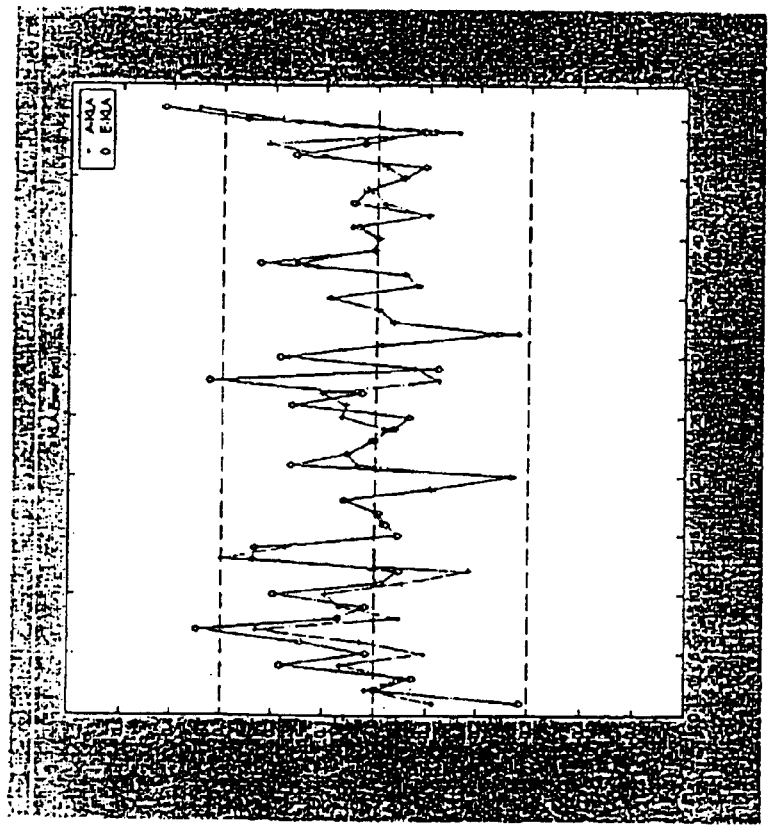
Figure 29:
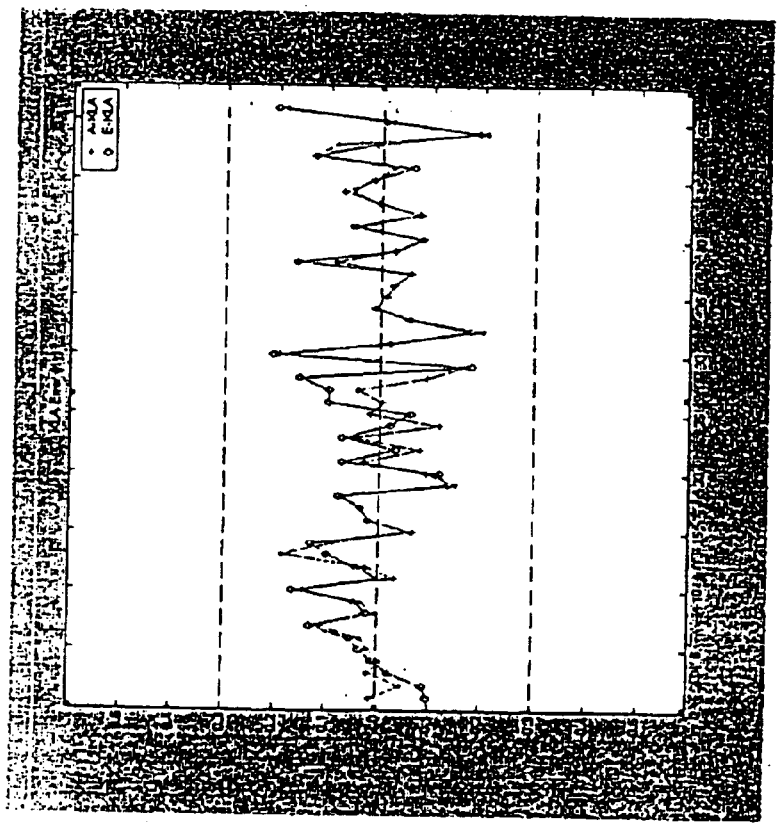
Figure 30:
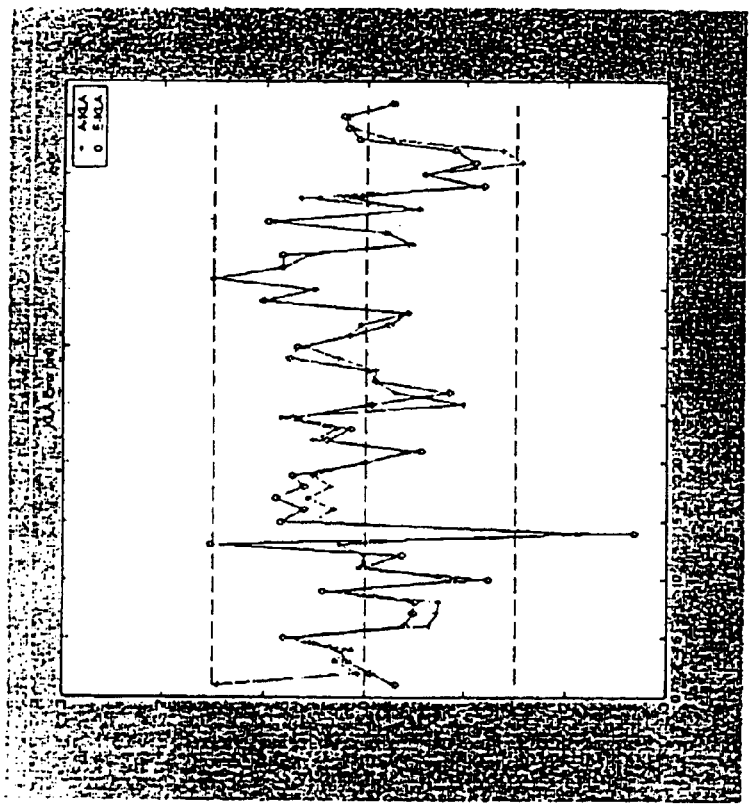
Figure 31:
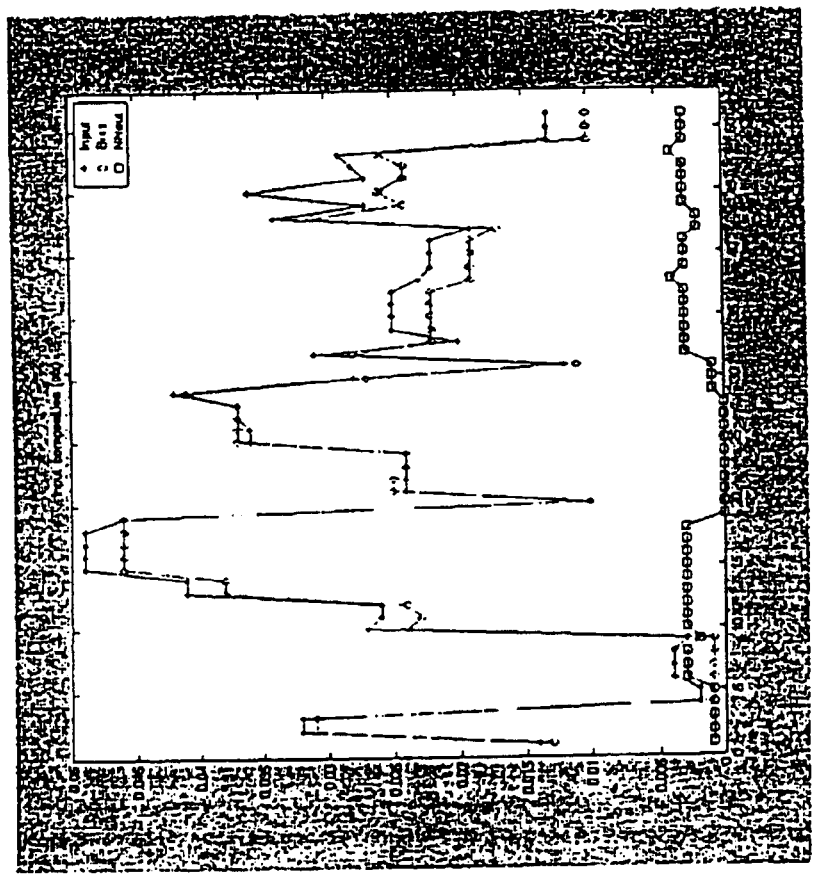
Figure 32:
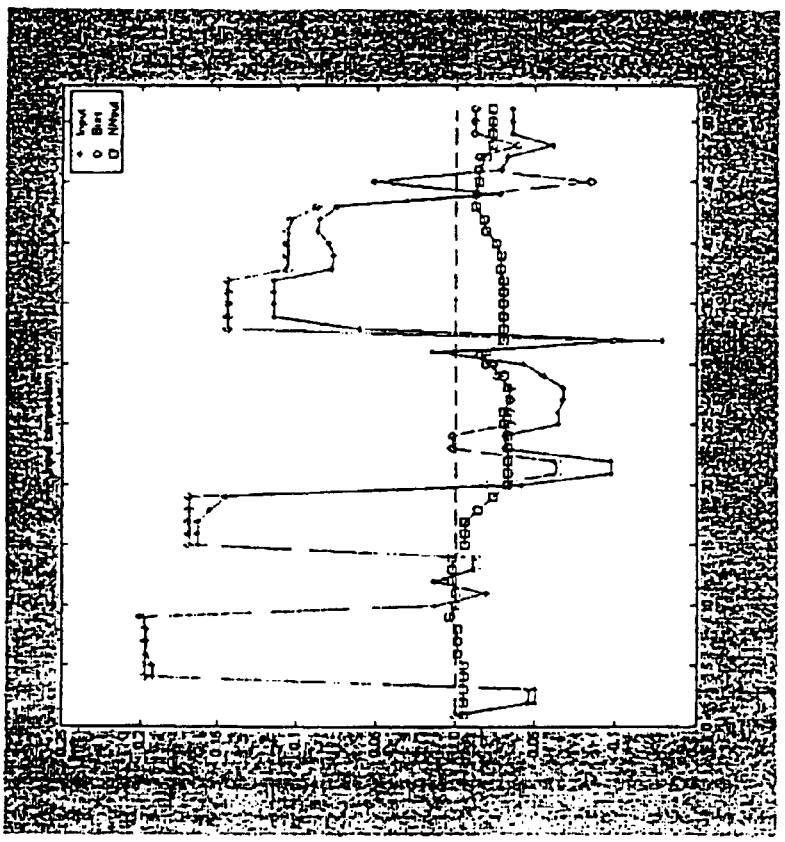
Figure 33:
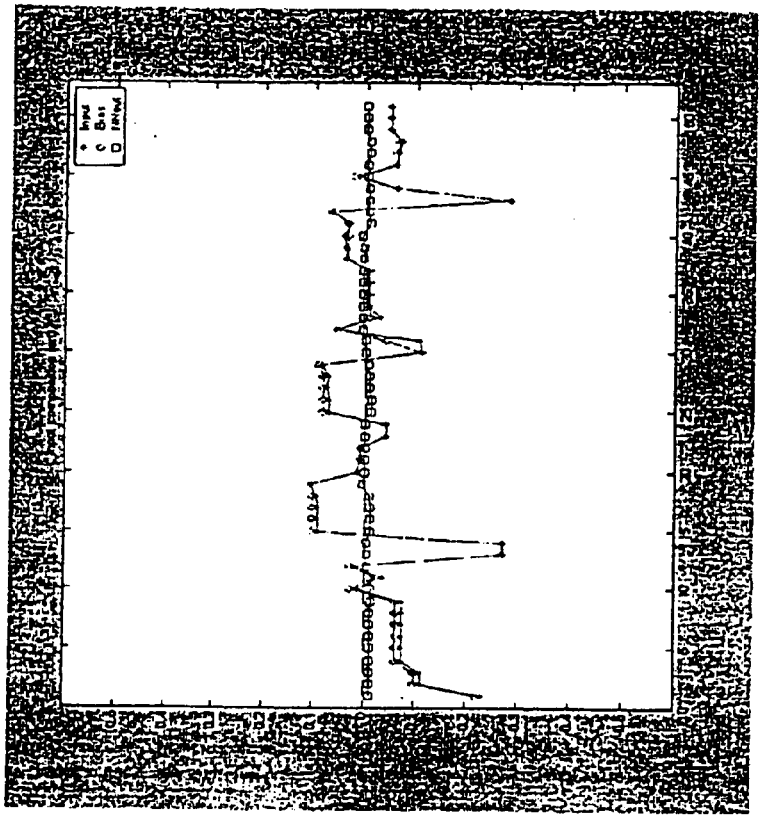
Figure 34:
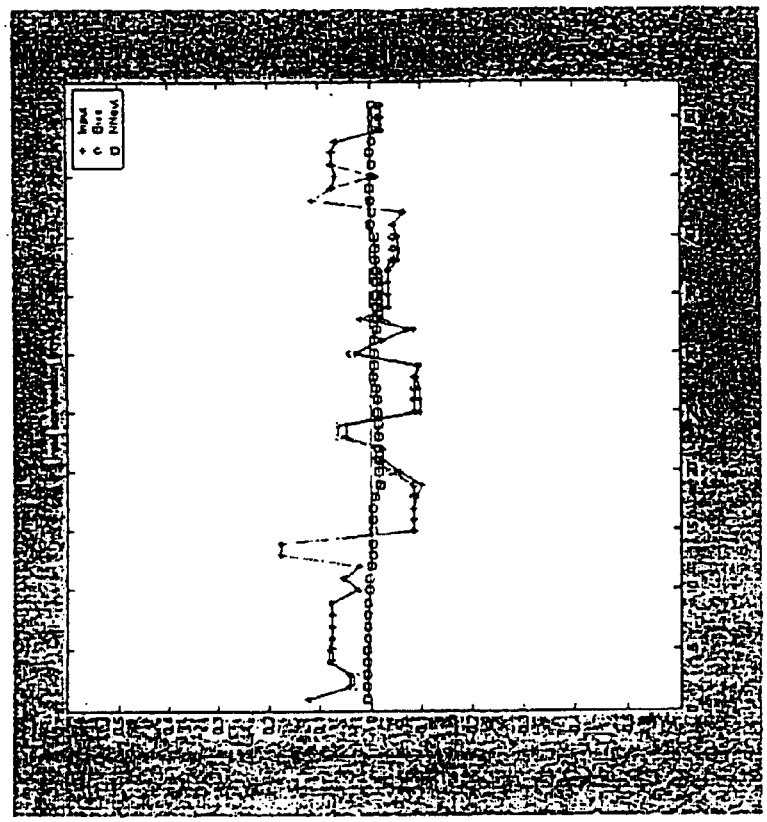
Figure 35:
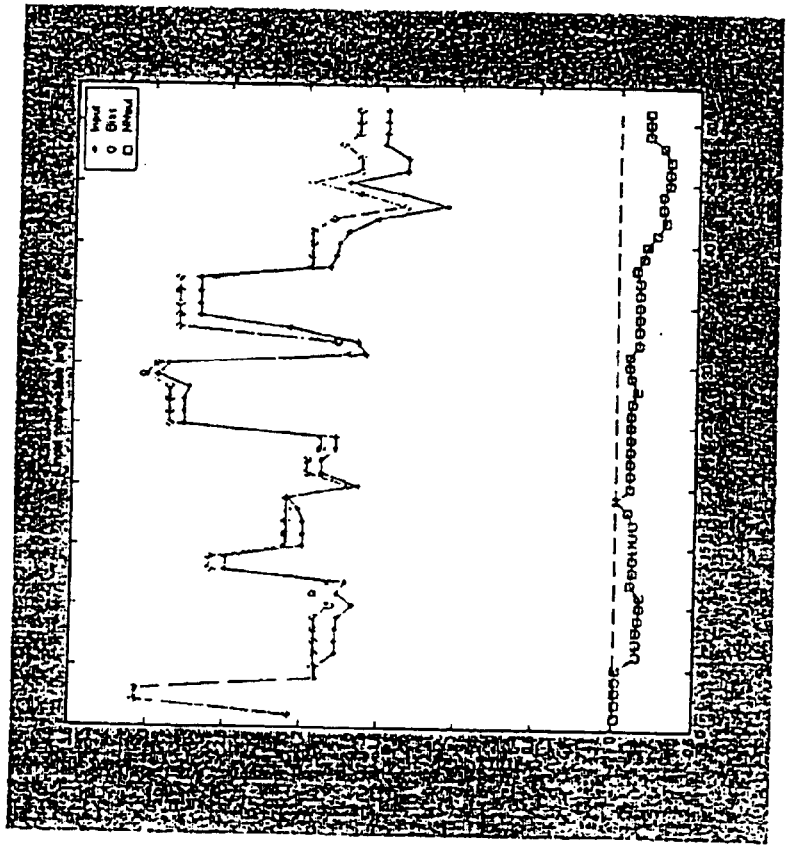

FIG. 20 illustrates steps in an embodiment of the network neural update module. Referring to FIG. 20, the neural network update module calculates the sensitivities of respective layers sequentially from the third hidden layer to the first hidden layer for the purpose of the error feedback propagation learning (S226 to S230). Successively, the weights of respective layers are updated sequentially from the third hidden layer to the first hidden layer in response to the calculated sensitivities (S232 to S236), thereby finishing the update of the neural network.

* The result of trial experiments A trial experiment was executed with respect to the data of three A, B and C photolithography apparatuses. The case of initially starting the apparatus was supposed to begin the trial experiment under the state of no past processing data. Also, the performance of the ALMS-NN algorithm was verified by the comparison with a conventional algorithm.

Additionally, in case of managing the actual process, the measurement was not performed immediately after the photolithographic process, which was considered in the trial experiment to suppose the measuring delay of about 5 lots or so. That is, after elapsing the processing time of about 5 lots after performing the process, the measurement error was to be utilized.

The result of the trial experiment investigated for the performance comparison is the spec-in ratio of which measurement error does not deviate from the spec-in range. The spec-in ratio of the typical algorithm was obtained by the measurement error over the data. In connection with the ALMS-NN algorithm, the spec-in ratio was obtained by obtaining a virtual measurement error that was regarded as being measured when the apparatus input value produced in the ALMS-NN algorithm was applied.

Providing that the apparatus input value used in the traditional correction system is denoted by $i_c(n)$, the overlay measurement error measured by the lot subjected to the process by using the apparatus input value is denoted by $e_c(n)$, the apparatus input value computed in the ALMS-NN algorithm is denoted by $i_a(n)$, and the virtual measurement error to be used when using the above is denoted by $e_a(n)$, the following equation is defined:

$$i_c(n)-e_c(n)=i_a(n)-e_a(n)$$

Additionally, the spec-in ratio when the ALMS-NN algorithm was applied to cases incapable of conducting the sampling process just by using the typical algorithm was investigated to verify the possibility of decreasing the number of sampling process.

The cases necessarily involving the sampling process in the conventional system include a "no-history" case without referential data, since the lot having the history identical to that of the lot to be currently processed has never been processed, and an old history case having unreliable data owing to the expiration of a fixed time limit, even though the lot having the identical history has been processed.

A period considered in the simulation was the processing time of 150 lots. In other words, a case that the identical history exists, but wherein there were no data in the recent 150 lots, was considered as an old history case. When considering that not all lots were subjected to the measurement, it may be reasonable that the processing time of a single lot was roughly an hour, while the time required for processing a single lot was roughly 40 minutes because the data used in the trial experiment employ the cases of using the data totally subjected to the measurement.

Accordingly, the time taken for processing 150 lots or so may be roughly 5 to 6 days. Because the expiration of the data available in the typical algorithm was 3 to 5 days, the sampling process should be performed in view of the typical algorithm if no lot having the history identical to that of the current lot exists in the recently processed 150 lots or so.

In order to measure the spec-in ratio, the applied spec-in ranges were respectively −0.03~0.03 in case of the Offset-X and Offset-Y, −0.3~0.3 for the Scale-X, Scale-Y, Orthogonality and Wafer rotation-Y, and −1.5~1.5 for the Reticle reduction and Reticle rotation.

<Result of the trial experiment with respect to Apparatus No. A>

Among a total of 5200 numbers of data, no history cases occurred 40 times, in which the case of guessing $x_{bias}$ numbers 13, and the old history cases occurred 99 times.

| *Overall Spec-in ratio (%) | | |
| --- | --- | --- |
| | ALMS-NN | Traditional system |
| Offset-x | 91.01 | 89.27 |
| Offset-y | 89.64 | 88.35 |
| Scale x | 87.49 | 86.46 |

| -continued | | |
| --- | --- | --- |
| *Overall Spec-in ratio (%) | | |
| | ALMS-NN | Traditional system |
| Scale y | 83.24 | 84.15 |
| Orthogonality | 81.87 | 79.15 |
| Wafer rotation | 89.76 | 87.69 |
| Reticle-reduction | 94.97 | 94.15 |
| Reticle-rotation | 86.31 | 82.08 |

| *Spec-in ratio (%) when guessing $x_{bias}$ | |
| --- | --- |
| Guess of $x_{bias}$ | |
| offset-x | 92.30 |
| offset-y | 30.77 |
| scale x | 84.62 |
| scale y | 69.23 |
| Orthogonality | 76.92 |
| wafer rotation | 92.30 |
| reticle-reduction | 76.92 |
| reticle-rotation | 69.23 |

| *Spec-in ratio (%) of old history case | |
| --- | --- |
| Old history | |
| offset-x | 82.83 |
| offset-y | 77.78 |
| scale x | 92.93 |
| scale y | 84.85 |
| Orthogonality | 84.85 |
| wafer rotation | 87.88 |
| reticle-reduction | 89.90 |
| reticle-rotation | 85.86 |

<Result of the trial experiment with respect to Apparatus No. B>

Among a total of 3400 numbers of data, no history cases occurred 63 times, in which the case of guessing $x_{bias}$ numbers 13, and the old history cases occurred 161 times.

| *Overall Spec-in ratio (%) | | |
| --- | --- | --- |
| | ALMS-NN | Conventional system |
| offset-x | 92.21 | 87.85 |
| offset-y | 96.54 | 93.06 |
| scale x | 98.18 | 97.20 |
| scale y | 96.57 | 94.68 |
| Orthogonality | 92.87 | 90.06 |
| wafer rotation | 98.00 | 96.53 |
| reticle-reduction | 99.76 | 99.62 |
| reticle-rotation | 99.37 | 98.21 |

| *Spec-in ratio (%) when guessing $x_{bias}$ | |
| --- | --- |
| Guess of $x_{bias}$ | |
| offset-x | 69.23 |
| offset-y | 30.77 |
| scale x | 100.00 |
| scale y | 76.92 |
| Orthogonality | 92.55 |

-continued

| *Spec-in ratio (%) when guessing $x_{bias}$ Guess of $x_{bias}$ | |
|---|---|
| wafer rotation | 96.89 |
| reticle-reduction | 98.76 |
| reticle-rotation | 96.27 |

| *Spec-in ratio (%) of old history case Old history | |
|---|---|
| offset-x | 91.30 |
| offset-y | 95.03 |
| scale x | 95.65 |
| scale y | 91.92 |
| Orthogonality | 92.55 |
| wafer rotation | 96.89 |
| reticle-reduction | 98.76 |
| reticle-rotation | 96.27 |

<Result of the trial experiment with respect to Apparatus No. C>

Among a total of 3000 numbers of data, no history cases occurred 71 times, in which the case of guessing $x_{bias}$ numbers 23 and the old history cases occurred 70 times.

| *Overall Spec-in ratio (%) | | |
|---|---|---|
| | ALMS-NN | Traditional system |
| Offset-x | 95.86 | 95.43 |
| Offset-y | 94.68 | 94.67 |
| scale x | 93.84 | 94.07 |
| scale y | 82.36 | 87.77 |
| Orthogonality | 86.97 | 88.63 |
| Wafer rotation | 89.33 | 90.23 |
| Reticle-reduction | 92.39 | 96.07 |
| Reticle-rotation | 96.23 | 94.13 |

| *Spec-in ratio (%) when guessing $x_{bias}$ Guess of $x_{bias}$ | |
|---|---|
| offset-x | 82.61 |
| offset-y | 56.52 |
| scale-x | 91.30 |
| scale y | 86.96 |
| orthogonality | 78.26 |
| wafer rotation | 69.57 |
| Reticle-reduction | 82.61 |
| reticle-rotation | 82.61 |

| *Spec-in ratio (%) of old history case Old history | |
|---|---|
| offset-x | 88.57 |
| offset-y | 85.71 |
| scale x | 87.14 |
| scale y | 87.14 |
| Orthogonality | 90.00 |
| wafer rotation | 76.29 |

-continued

| *Spec-in ratio (%) of old history case Old history | |
|---|---|
| reticle-eduction | 75.71 |
| reticle-rotation | 88.57 |

When summarizing the results of the above-described trial experiments, it can be noted that the ALMS-NN algorithm displays results that were slightly improved over the conventional algorithm in association with the spec-in ratio.

However, considering that a main object of suggesting the ALMS-NN algorithm is to decrease the number of sampling processes which becomes a serious problem in the production system of variable kinds on a small scale, rather than improving the spec-in ratio, the spec-in ratio of the ALMS-NN presented in the results of the trial experiments was somewhat satisfactory.

In case of the Apparatus no. A, the distribution of the measurement error of the measurement instrument is represented by the graphs shown in FIGS. 21 to 25 so as to check the scattering of the measurement error of the overlay measurer instrument, in which there was no significant difference between the typical algorithm and ALMS-NN algorithm (The measurement error distributions with respect to the Apparatuses nos. B and C were similar to that of the Apparatus no. A, which thus will be omitted).

In order to decrease the number of actual sampling processes when the $x_{bias}$ value is guessed by applying the ALMS-NN algorithm in case no identical history data or old history data is, the spec-in ration should not be greatly lowered below the overall spec-in ratio.

The probability in the event that the $x_{bias}$ value can be guessed with respect to all cases involving no identical history is 32.5% for the apparatus no. A, 20.1% for the apparatus no. B, and 32.4% for the apparatus no. C. The spec-in ratio obtained when the value guessed as above was used for producing the apparatus input value to proceed the processing was slightly less, but maintained about 70~80% of the overall spec-in ratio.

The spec-in ratio with respect to the case of using old history data offers the results that approximately equal the overall spec-in ratio in three apparatuses subjected to the trial experiments altogether. This shows a possibility of solving the data expiration problem having been a significant problem heretofore in the typical algorithm by applying the ALMS-NN algorithm thereto.

* The result of application to actual apparatus

The process application of the ALMS-NN algorithm for verifying the suitability and pertinence to the actual process was carried out over three days while performing the process of in a total of 67 lots in total via the test.

While conducting the process, there was no case of applying the algorithm for guessing the $x_{bias}$ owing to no identical history, but the case liable to be subjected to the sampling process if applying the typical algorithm because of the expiration of the data occurred 17 times. Of course, these cases involved no sampling process since the expiration of the data was not considered when applying the ALMS-NN algorithm.

The test results in about 98% of spec-in ratio. In other words, the case that required repeated process due to the generation of the spec-out occurs at about 2% or so. This numerical value was far lower than the 8% that was the overall spec-out generation ratio when the conventional algorithm without the ALMS-NN algorithm was applied.

FIGS. 26 to 35 show graphs representing the comparison of the measurement error A-KLA obtained via the test when applying the ALMS-NN algorithm, with the virtual measurement error E-KLA when applying the apparatus input value produced via the conventional algorithm, and the format of the apparatus input value produced by the ALMS-NN algorithm.

As shown in FIGS. 26 to 30, the scattering of the measurement error of the overlay measurement instrument was nearly similar in both cases of using the ALMS-NN algorithm and the conventional algorithm.

As shown in FIGS. 31 to 35, it can be noted that the apparatus input values correspond to the sum of the bias value and RAND value (output value of the neural network).

While the photolithography apparatus was given as an example in the embodiments described above, the algorithm of the present invention can be applied in controlling the apparatus correction value by separately considering the bias correction value based on the past history and a random RAND value with respect to all equipment of the automatic controlling system using the computer in the semiconductor process, e.g., plasma apparatus, CMP apparatus and CVD apparatus.

In the photolithographic process as described above, the apparatus input value for the accurate prediction of the overlay measurement error and compensation of the error is determined by dividing it into the bias component and RAND component. Here, the bias component is determined by the prediction and guess of the history, while the RAND component is provided after utilizing all data via the learning and tracking by means of the neural network without involving a time limit. Therefore, the number of sampling processes is remarkably decreased to improve the production yield.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. In a method for controlling a processing apparatus comprising the steps of: obtaining an error value between an input value of the processing apparatus for processing an subject to be processed and a measurement value obtained by measuring the subject processed in the processing apparatus, computing a correction value for correcting the input value of the processing apparatus in the direction of decreasing the error value, and managing the values as processing data to be utilized in computing a next correction value, said method further comprising the steps of:
searching previous processing data having a history identical to that of the subject loaded into the processing apparatus;
predicting a current bias correction value from a plurality of most recent previous correction values out of the searched previous processing data having the identical history;
predicting a current random correction value by means of a neural network on a basis of a plurality of most recent previous random correction values out of the previous processing data;
summing the predicted current bias correction value and the predicted current random correction value as a current correction value of the processing apparatus; and
making the neural network learn for tracking a variation of the random correction value by using the error value.

2. A method for controlling a processing apparatus as claimed in claim 1, wherein said step of predicting the current bias correction value is performed by means of a section linear weighted mean algorithm defined as the following equation:

$$x_{bias} = \frac{1}{W} \sum_{i=n-W+1}^{n} \left[ \frac{W+n-1}{\sum_{j=1}^{W} i} x_{sh}(i) \right]$$

where a reference alphabet $x_{bias}$ denotes the bias correction value, W denotes a number of sections, and $x_{sh}$ denotes a previous bias correction value having the identical history.

3. A method for controlling a processing apparatus as claimed in claim 1, wherein the neural network is comprised of a multilayer perceptron, and the learning method employs an error feedback propagation system.

4. A method for controlling a processing apparatus as claimed in claim 1, wherein the processing apparatus is comprised of a manufacturing apparatus of a semiconductor device in the production system of variable kinds on a small scale.

5. In a method for controlling a photolithography apparatus comprising the steps of: obtaining an error value between an input value of the photolithography apparatus for processing a photoresist over a wafer and a measurement value obtained by measuring a photoresist pattern subjected to an exposure and a development in the processing apparatus by means of an overlay measurement instrument; computing a correction value for correcting the input value in a direction of decreasing the error value; and managing photolithographic processing data in the production time unit for utilizing the values in computing a next correction value, said method further comprising the steps of:
searching previous processing data having a history identical to that of a new lot loaded into the photolithography apparatus;
predicting a bias component of a current correction value from a plurality of most recent previous correction values out of the searched previous processing data having the searched identical history;
predicting a random component of the current correction value by means of a neural network on a basis of a plurality of most recent previous random correction values out of the previous processing data;
summing the predicted bias component and random component as a current correction value of the photolithography apparatus; and
making the neural network learn for tracking the variation of the random component by using the error value.

6. A method for controlling a processing apparatus as claimed in claim 5, wherein said step of predicting the bias portion of the current correction value is performed by means of a section linear weighted mean algorithm defined as the following equation:

$$x_{bias} = \frac{1}{W} \sum_{i=n-W+1}^{n} \left[ \frac{W+n-1}{\sum_{j=1}^{W} i} x_{sh}(i) \right]$$

where a reference alphabet $x_{bias}$ denotes the bias component of the correction value, W denotes a number of sections and, $x_{sh}$ denotes the previous bias component having the identical history.

7. A method for controlling a photolithography apparatus as claimed in claim 6, wherein the number of sections is 10.

8. A method for controlling a photolithography apparatus as claimed in claim 5, wherein, in said searching step, data having an identical reticle, PPID, BASE I and BASE II, that are history constituting elements, are detected as identical history processing data.

9. A method for controlling a photolithography apparatus as claimed in claim 8, wherein, if no processing data of identical history exists in said searching step, the bias portion of the correction value is guessed in accordance with a priority of remaining history constituting elements among processing data having the identical reticle.

10. A method for controlling a photolithography apparatus as claimed in claim 9, wherein said guessing method comprises the steps of:
    extracting processing data having any one different history constituting element among the history constituting elements;
    guessing the bias component of the correction value by using a relative value of any one history constituting element among the extracted processing data with the one different history constituting element; and
    when the bias component cannot be computed by means of the relative value, guessing the bias component of the correction value by obtaining a mean value of the extracted processing data with the one different history constituting element.

11. A method for controlling a photolithography apparatus as claimed in claim 10, wherein the priority is provided in the order of history constituting elements exerting the least influence, from BASE II, BASE II and then PPID.

12. A method for controlling a photolithography apparatus as claimed in claim 10, further comprising the step of requesting the proceeding of a sampling process when even the bias component cannot be guessed.

13. A method for controlling a photolithography apparatus as claimed in claim 5, wherein the neural network is comprised of a multilayer perceptron, and the learning method is an error feedback propagation method.

14. A method for controlling a photolithography apparatus as claimed in claim 13, wherein the multilayered perceptron comprises:
    an input layer having three input nodes;
    an output layer having one output node; and
    a three-layered hidden layer between the input layer and output layer.

15. A method for controlling a photolithography apparatus as claimed in claim 14, wherein neurons of the hidden layer employ a sigmoid function as a transfer function.

16. A method for controlling a photolithography apparatus as claimed in claim 14, wherein neurons of the output layer employ a linear function as a transfer function.

17. In a method for controlling a photolithography apparatus comprising the steps of: obtaining an error value between an input value of the photolithography apparatus for performing a photolithography upon a photoresist over a wafer and a measurement value obtained by measuring a photoresist pattern subjected to an exposure and a development in the photolithography apparatus via an overlay measurement instrument; computing a correction value for correcting the input value in a direction of decreasing the error value; and managing photolithographic processing data in the production time unit for utilizing the values in computing a next correction value, said method further comprising the steps of:
    searching previous processing data having history constituting elements (Reticle, PPID, BASE I and BASE II) identical to those of a new lot loaded into the photolithography apparatus;
    predicting a bias component of a current correction value from a plurality of most recent previous correction values out of the searched previous processing data having the identical history constituting elements;
    extracting processing data with one different constituting element except the Reticle among the history constituting elements when no previous processing data having the identical history constituting elements exists;
    guessing the bias component of the correction value by means of a relative value of a certain history constituting element out of the processing data with a single different history constituting element extracted;
    obtaining a mean value of the processing data with the extracted single different history constituting element to be guessed as the bias component of the correction value when the bias component cannot be computed by using the relative value;
    predicting a random component of the current correction value by means of a neural network on a basis of a plurality of most recent previous random correction values out of the previous processing data;
    summing the predicted bias component and predicted random component as a current correction value of the photolithography apparatus; and
    making the neural network learn for tracking a variation of the random correction value by using the error value.

18. A method for controlling a photolithography apparatus as claimed in claim 17, wherein, in said guessing step, the priority is provided in the order of exerting the least influence from BASE II, BASE II and then PPID.

* * * * *